United States Patent [19]

Hampshire et al.

[11] Patent Number: 5,777,816

[45] Date of Patent: Jul. 7, 1998

[54] DATA TRACK FOLLOWING METHOD FOR DISC DRIVES

[75] Inventors: Randall D. Hampshire, Edmond; Philip R. Woods, Oklahoma City, both of Okla.

[73] Assignee: Seagate Technology, Inc., Scotts Valley, Calif.

[21] Appl. No.: 60,858

[22] Filed: May 12, 1993

[51] Int. Cl.$^6$ ............................................. G11B 5/596
[52] U.S. Cl. ............................................. 360/77.08
[58] Field of Search ........................... 360/77.04, 77.05, 360/78.04, 61, 77.06

[56] References Cited

U.S. PATENT DOCUMENTS

| | | | |
|---|---|---|---|
| 3,994,016 | 11/1976 | Moghadam | 360/77.02 |
| 4,135,217 | 1/1979 | Jacques et al. | 360/77.04 |
| 4,136,365 | 1/1979 | Chick et al. | 360/78.05 |
| 4,149,199 | 4/1979 | Chick et al. | 360/77.04 |
| 4,371,960 | 2/1983 | Kroiss | 369/43 |
| 4,594,622 | 6/1986 | Wallis | 360/72.04 |
| 4,630,190 | 12/1986 | Alaimo et al. | 364/167.01 |
| 4,764,914 | 8/1988 | Estes et al. | 369/58 |
| 4,890,172 | 12/1989 | Watt et al. | 360/77.04 |
| 4,918,972 | 4/1990 | Kenny et al. | 360/77.04 X |
| 5,270,885 | 12/1993 | Satoh et al. | 360/77.04 |

*Primary Examiner*—Aristotelis M. Psitos
*Attorney, Agent, or Firm*—Bill D. McCarthy; Edward P. Heller, III; Randall K. McCarthy

[57] ABSTRACT

A method for following a selected data track on a selected data surface of a disc drive of the type having a dedicated servo system in which guiding of data heads to follow data tracks on data surfaces is effected by positioning an actuator upon which the data heads are mounted in relation to the location of a servo head, also mounted on the actuator, with respect to servo tracks on a dedicated servo surface. The data tracks are organized into cylinders, each containing a servo track, and a selected data track is accessed by seeking to an optimum servo track displaced from the servo track in the cylinder containing the data track by an integral number of track spacings selected to compensate for misalignments greater than a track spacing between the data and servo heads. Data track following is then effected by offsetting the servo head from the optimum servo track to compensate for misalignments of less than a track spacing between the data and servo heads and tracks.

4 Claims, 11 Drawing Sheets

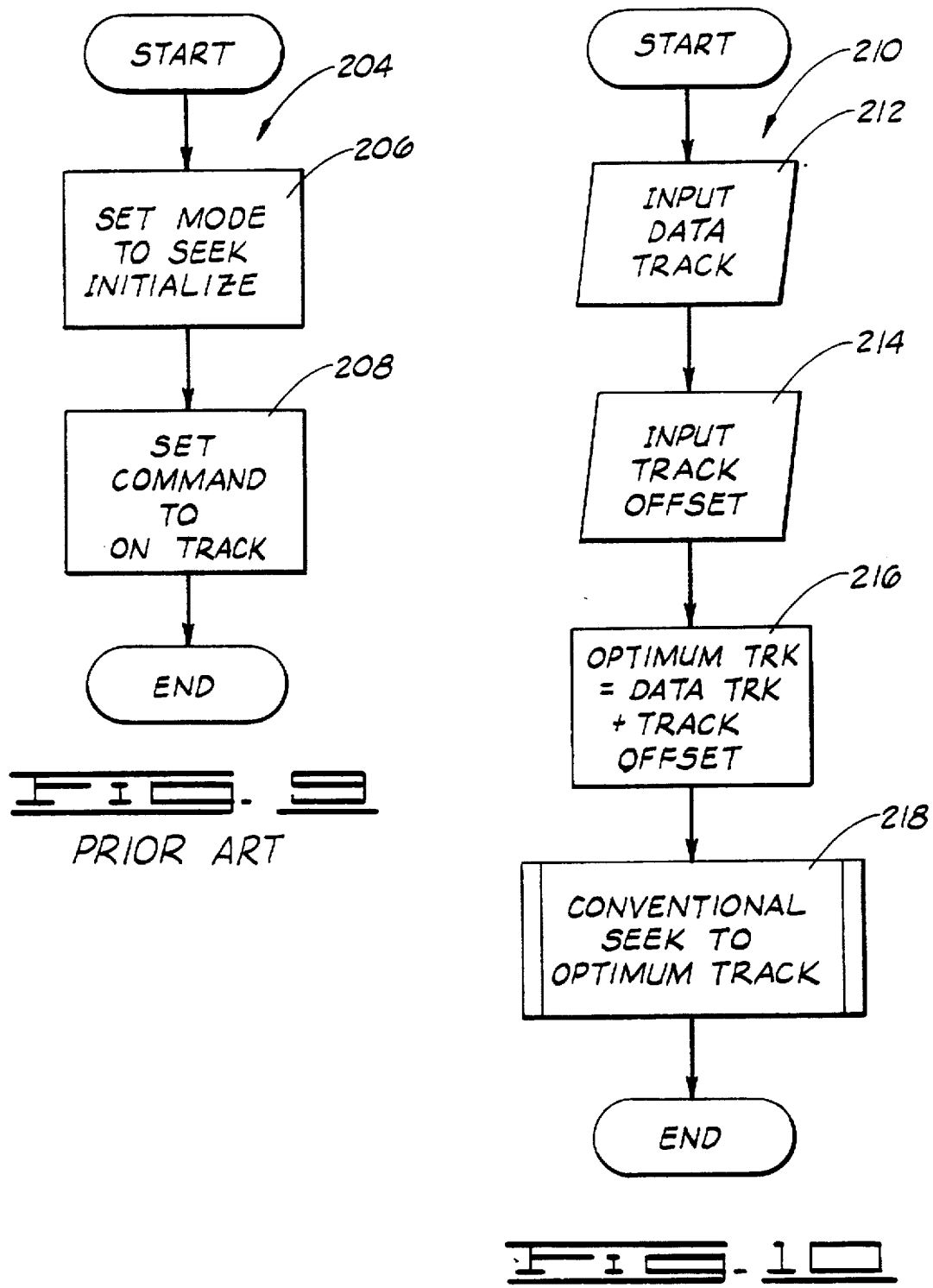

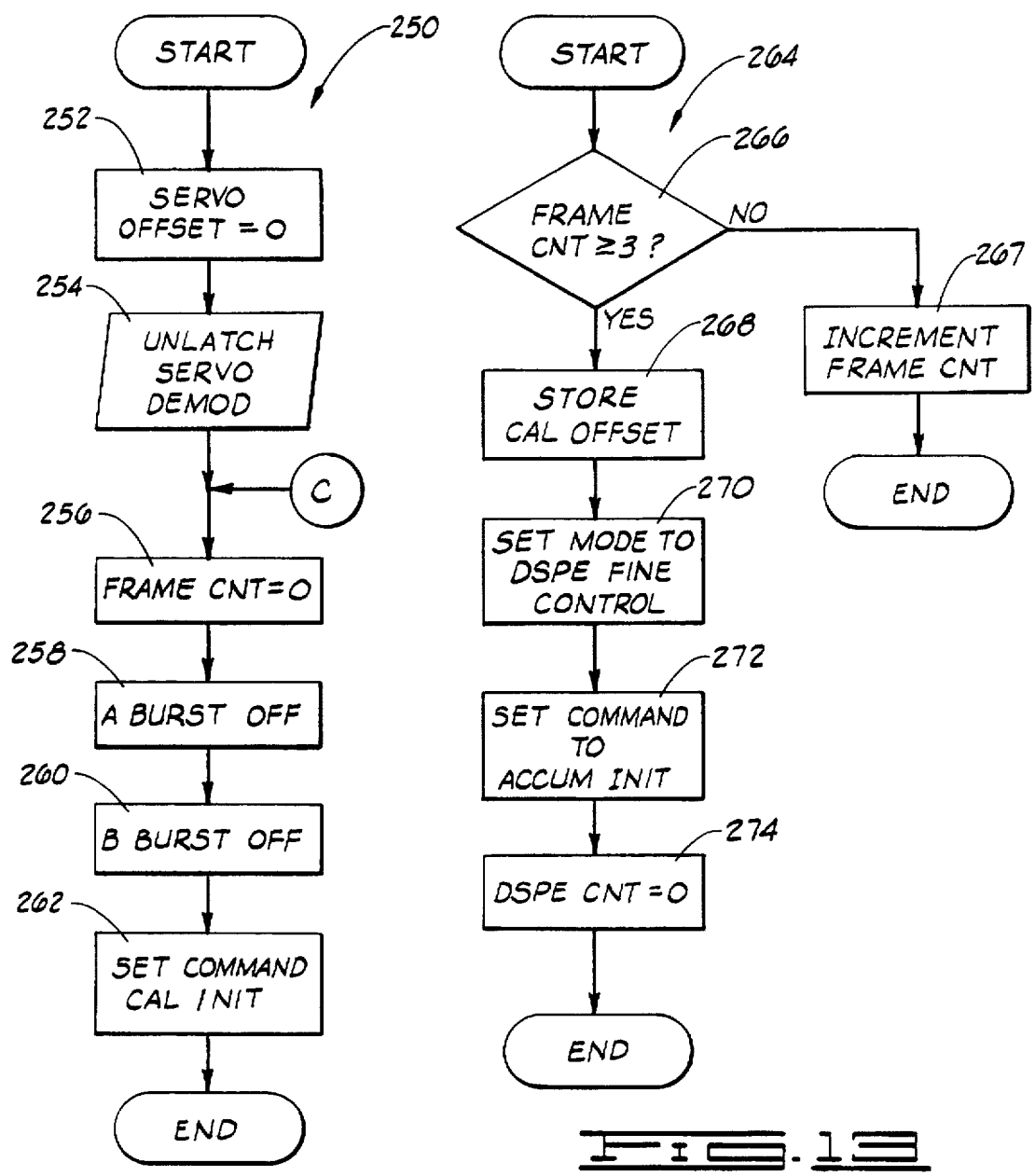

DATA TRACK FOLLOWING METHOD FOR DISC DRIVES

BACKGROUND OF THE INVENTION

1. Field of the Invention

The present invention relates generally to improvements in track following methods in disc drives, and, more particularly, but not by way of limitation to improvements in methods for compensating for misalignment of data heads and tracks with a servo head and servo tracks in disc drives of the type in which data track following is effected by following servo tracks on a dedicated servo surface.

2. Brief Description of the Prior Art

In hard disc drives having a plurality of stacked, rotating discs for storage and retrieval of computer files, the files are stored along concentric data tracks on surfaces of the discs using data transducers, or heads, positioned in proximity to the disc surfaces to write the files and, subsequently, to read them. In order that a file, once written, can be retrieved, records are maintained of the tracks and disc surfaces to which the file is written and the disc drive is comprised of a head select logic circuit that selects one of the data heads for writing the file and a servo system that is used to radially position the data heads, as a group, for selection of data tracks on the surface that is to receive the file. Thus, once a file has been stored, it can be retrieved by moving the heads to the selected track and reading the file using the head that was used to write it.

To control the radial position of the heads, the heads are mounted on an electromechanical actuator and servo patterns, written to at least one of the disc surfaces, are sampled by the servo system to obtain head position information from which actuator correction signals can be generated and transmitted to the actuator to reposition the actuator and thereby maintain radial alignment between the heads and tracks to which a file is to be written or from which a file is to be read. While the servo patterns may be embedded in the files, a more common approach in disc drives that include a plurality of discs is to use one disc surface as a dedicated servo surface, to which the servo patterns are written during manufacture of the disc drives, and use the mounting of the heads on a common actuator to position the data heads by positioning the servo head, the head proximate the dedicated servo surface, to follow servo tracks defined by the servo pattern on the servo surface. To this end, the data tracks on separate disc surfaces are organized into cylinders, each of which includes a servo track on the servo surface, and control of the radial positions of the heads is effected on a cylinder basis. Since, only one disc surface need contain servo patterns in the case in which a dedicated servo surface is used, a net gain in disc drive storage capacity can often be achieved when the disc drive is comprised of a plurality of discs. Specifically, the elimination of servo patterns on the remaining surfaces; that is, the data surfaces, more than compensates for the loss of availability of the dedicated servo surface for the storage of files.

While the use of a dedicated servo surface can thus increase the data storage capacity of a disc drive, it also gives rise to a limitation on the storage capacity of the disc drive. As will be clear to those of skill in the art, the data storage capacity of a disc drive depends upon the spacing of data tracks on the disc surfaces; the more closely the tracks are spaced, the larger the number of tracks that can be made available for the storage of data. However, as the track spacing is reduced, the mounting of the heads on the actuator and the mounting of the discs on a spindle motor that rotates the discs during operation of the disc drive, give rise to a problem that limits the density of tracks on the discs. To provide a basis for discussing this problem, it will be useful to consider the manner in which the cylinders containing the data and servo tracks are defined.

When a disc drive is manufactured, servo patterns defining equally spaced servo tracks on the dedicated servo surface are written to such surface so that, thereafter, the servo head can be moved to any track on the dedicated servo surface and such track can be followed employing the servo system of which a disc drive is comprised. However, the writing of the dedicated servo surface does not complete preparations for the use of the disc drive. In particular, the data tracks on the data surfaces and the cylinders into which the data and servo tracks are organized are not defined until the discs are formatted. Formatting is carried out by operating the servo system to cause the servo heads to follow the servo tracks, without offset, while headers that define the data tracks are written to a plurality of sectors along each of the data tracks. Since the servo tracks are equally spaced, the data tracks will similarly be equally spaced and will have the same spacing as the servo tracks. Thus, a cylinder is comprised of the servo track that is followed while the headers are written and the data tracks defined by the headers.

It will be noted that such manner of defining the cylinders does not necessarily mean that the data tracks are concentric with the servo tracks or that they have the same radii as the servo tracks. Such need not be the case. Rather, the condition that defines the cylinders is that, at the time of formatting, each data head will be aligned with a data track in a cylinder if the servo head is aligned with the servo track in the same cylinder. Moreover, it will be equally clear that, so long as no changes occur in the mounting of the discs on the spindle motor or in the mounting of the heads on the actuator, a data head can be caused to follow a data track, without offset, by following the servo track in the same cylinder without offset.

The problem with this approach to data track following is that the mounting of the heads and the mounting of the discs do change with time. The heads are mounted on the ends of support arms that are mechanically attached to the actuator body and, as is well known, mechanical attachments are subject to geometrical changes that can arise from a variety of factors. For example, large temperature changes that occur with transport of a disc drive in an unheated cargo hold of an airplane can give rise to a permanent change in the relative locations of the data and servo heads. Similarly, acceleration of the heads and small changes in the ambient temperature during operation of a disc drive can give rise to changes in such relative locations. The latter problem is especially severe when, as is common practice, attempts are made to maximize the number of discs in a drive, to increase data storage capacity, by mounting the head support arms in a manner that will enable the spacing between the arms to be minimized. Such minimization may not be consistent with rigid and, consequently, bulky arm attachment methods.

Nor are the discs immune to mounting changes that will give rise to changes in the alignment of the data and servo tracks. For example, the discs are generally mounted on the rotor of the spindle motor and separated by spacers which form the discs into a stack in which the discs are substantially, but not exactly, parallel. This lack of an exact parallel relation results in the data and servo heads tracing out ellipses of different eccentricity on the data and servo surfaces as the discs rotate. Because of the mounting of the discs directly on the motor, a mounting that is necessitated by space limitations in a computer with which the drive is used, the discs and spacers will be heated each time the disc drive is used to cause changes in the angles between normals to the discs and the axis of the spindle.

Because these changes in the geometry of the discs and the heads can limit the density of tracks on the discs, it is common practice to calibrate the disc drive to compensate for the changes. To this end, a thermal calibration track, containing servo information, is written to each data surface at the time the drive is formatted. Since the data tracks are defined at the same time, the data tracks will be concentric with the thermal calibration track and, further, since each disc has its own set of data and calibration tracks, changes in the mounting of the discs and the heads will not effect the geometrical relationship between the data tracks and calibration tracks on each disc surface. Thus, the calibration track on any data surface can be read from time to time to determine an orientation dependent thermal calibration relation by means of which the servo head can be offset from a servo track to cause a data track on that data surface to be followed by the data head proximate that data surface.

While thermal calibration has provided an effective solution to the problem of changes in the mounting of the discs and heads for track spacings commonly employed in the past, it has proved inadequate for further decrease in track spacings that can be employed with improvements in the heads. In particular, while further decreases in track spacing might be effected, such decreases have been prevented by an inability of servo systems to offset the servo head sufficiently to exploit the advances that have been made in head technology.

The source of this problem is that long term effects, effects that will cause the misalignments underlying the need for the calibration to increase over long periods of time, require that the conventional thermal calibration approach be limited to relatively small changes in the mounting of the heads and discs. The present invention provides a method for compensating for these long term effects that greatly increases the capacity of a disc drive by limiting thermal calibration to compensation for short term effects that occur during the operation of a disc drive.

SUMMARY OF THE INVENTION

It has been found that the long term effects are associated primarily with the mounting of the head support arms on the actuator; that is, with relative locations of the servo and data heads. Thus, as noted above, accelerations of the heads at the ends of the arms by means of which the heads are mounted on the actuator can give rise to head misalignments that increase with time as can large temperature changes that might occur during disc drive transport. However, such changes will generally cause only a change in the radii of paths traced on the disc surfaces by the heads as the discs rotate. In general, variations in the geometries of these paths that depend upon disc orientation arise from the changes in the mounting of the discs on the spindle and, because of the relative rigidity of the disc stack, are small in comparison to long terms variations in head alignments.

In the present invention, this difference is exploited by limiting thermal calibration to short term, disc orientation dependent effects for which thermal calibration is well suited while providing additional compensation for the long term head misalignments that will give rise to constant, but large, displacements between data heads and data tracks at such times that a servo track is followed by the servo head. To this end, the method of the present invention contemplates that the servo track following will not be limited to track following of the servo track in the same cylinder as the data track to which a file to be accessed is written. Thus, in the present invention, data track following is effected by seeking to an optimum servo track that is displaced from the servo track in the cylinder that contains a selected data track by a track offset that will compensate for misalignments between the servo and data heads and tracks that exceed the spacing between tracks on the disc surfaces. Smaller, orientation dependent misalignments are then compensated by offsetting the servo head from the optimum servo track. Thus, the track spacing can be decreased to a spacing that is limited only by the extent to which the path traced on the servo surface by the servo head, during data track following, departs from a circle displaced from the optimum servo track by no more than a half track spacing.

An important object of the present invention is to increase the storage capacity of a disc drive by decreasing the spacing between data and servo tracks on surfaces of discs of the drive.

Another object of the invention is to compensate for long term effects that can interfere with data track following in disc drives employing a servo system that utilizes a dedicated servo surface in the implementation of track following.

Other objects, advantages and features of the invention will become apparent from the following detailed description when read in conjunction with the drawings and appended claims.

BRIEF DESCRIPTION OF THE DRAWINGS

FIG. 9 is a flow chart of the servo microprocessor SEEK command routine.

FIG. 10 is a flow chart of the servo microprocessor SEEK INITIALIZE mode routine.

FIG. 12 is a flow chart of the Servo Microprocessor CALIBRATION Command Routine.

FIG. 13 is a flow chart of the Servo Microprocessor CALIBRATION INITIALIZE Command Routine.

FIG. 18 is graph of the servo head location for one revolution of the discs during calibration of a data head.

DISC DRIVE DESCRIPTION

Figure 1:
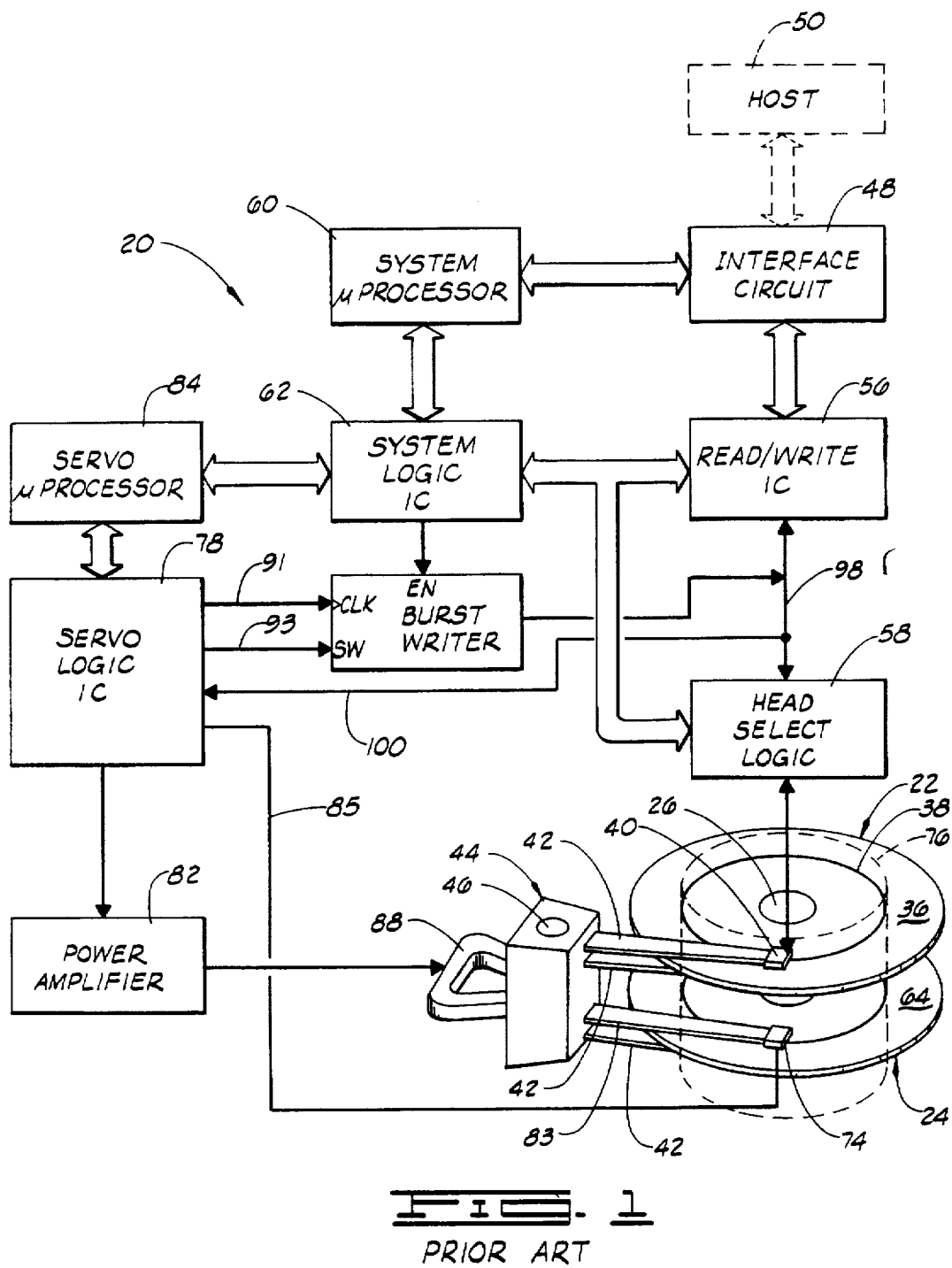
FIG. 1 is a block diagram of a disc drive in which the method of the present invention can be advantageously practiced.

In order to provide a basis for describing the method of the present invention, it will be useful to initially consider the construction of a disc drive in which the invention may be practiced. For this purpose, FIGS. 1 through 3 have been included to generally illustrate the construction of a typical hard disc drive. It will be understood by those of skill in the art that the method of the present invention is not limited to disc drives having the specific construction shown in these drawings; rather, such construction has been presented in the spirit of providing a concrete example that will facilitate an understanding the invention. Thus, no limitation not expressed in the claims is intended nor should any such limitation be inferred from the specific form of the disc drive that has been illustrated in the drawings and described below.

Similarly, for purposes of illustration, but not of limitation, it will be assumed herein that the invention will be practiced using the digital servo system that has been described in U.S. patent application Ser. No. 738,053 filed Jul. 31, 1991 by Duffy et al. and entitled "Hard Disc Drive With Improved Servo System" and, further, that the disc drive is programmed using the methods described in the aforementioned U.S. patent application Ser. No. 738,053 and in U.S. patent application Ser. No. 738,584, filed Jul. 31, 1991 by Hampshire and entitled "Multi-Task Operating System for a Disc Drive". The teachings of both of these United States Patent Applications are hereby incorporated by reference.

Referring first to FIG. 1, shown therein and designated by the general reference numeral 20 is a block diagram of a typical hard disc drive in which the present invention may be advantageously practiced. In general, the disc drive 20 is comprised of a plurality of discs, two of which have been illustrated and designated by the numerals 22 and 24, that are mounted in a stack on a spindle 26, for rotation of the discs 22, 24 about the axis of the spindle 26. The discs 22, 24 are provided with magnetizable surface coatings so that data can be stored on the discs 22, 24 in the form of magnetized cells along circular data tracks defined on data surfaces of the discs as will be described below. One such data track, designated 38 in FIG. 1., has been illustrated for the data surface 36 illustrated in FIG. 1 as the upper surface of the disc 22.

Data is written to the data surfaces and read therefrom by a plurality of data heads that are supported proximately the data surfaces, as shown for a data head 40 and the data surface 36 in FIG. 1, by an electromechanical actuator 44 via support arms 42. As will be discussed below, the actuator 44 can be pivoted on a spindle 46 to align the data heads with selected tracks on the data surfaces of the discs.

To provide for the reading and writing of files, the disc drive 20 is comprised of a conventional interface circuit 48 that effects the transfer of files between a host 50, the source of files to be stored and the user of previously stored files, and a selected data head. As is conventional, data is transferred from the host 50 to a buffer (not shown) of which the interface circuit 48 is comprised and thence to a read/write IC 56 that serializes data of which the file is comprised, encodes the file for storage to a data surface and, subsequently, decodes and deserializes the file when it is retrieved. During writing of a file, electrical signals indicative of the contents of the file are transmitted serially from the read/write IC 56 to a data head via a head select logic 58 that selects a particular data head that is to write the file. During reading of a file, signals indicative of the pattern of magnetization of the data tracks are induced in the data heads as the disc surfaces pass the data heads and the head select logic 58 transmits signals induced in a selected data head, the data head proximate the disc surface on which the file is stored, to the read/write IC 56 for subsequent transfer to the host 50.

General control of the operation of the disc drive 20 is exercised by a system microprocessor 60 that provides appropriate control signals to the interface circuit 48, the read/write IC 56 and the head select logic 58 to orchestrate the transfer of data to and from the host 50 and to select the data surface and track thereon for storage or retrieval of a file. Control of the latter two circuits is effected via a system logic IC 62 by control words indicative of conventional operations that are carried out by such circuits during the reading or writing of files. As will be discussed below, commands outputted to the system logic IC are further utilized to effect control of movements of the data heads by the drive servo system to be described below.

Figure 2:
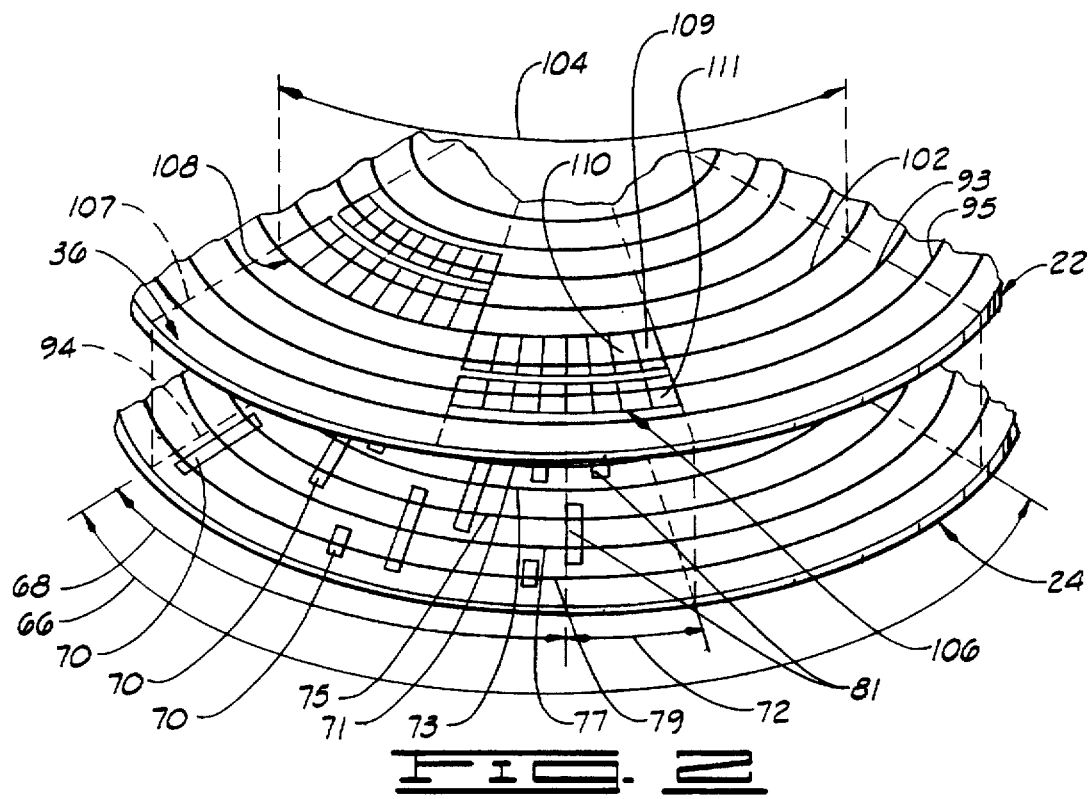
FIG. 2 is a fragmentary perspective view of discs of the disc drive of FIG. 1 illustrating the geometric relationship between position and address fields on the dedicated servo surface and thermal calibration tracks on the data surfaces.
Figure 1B:
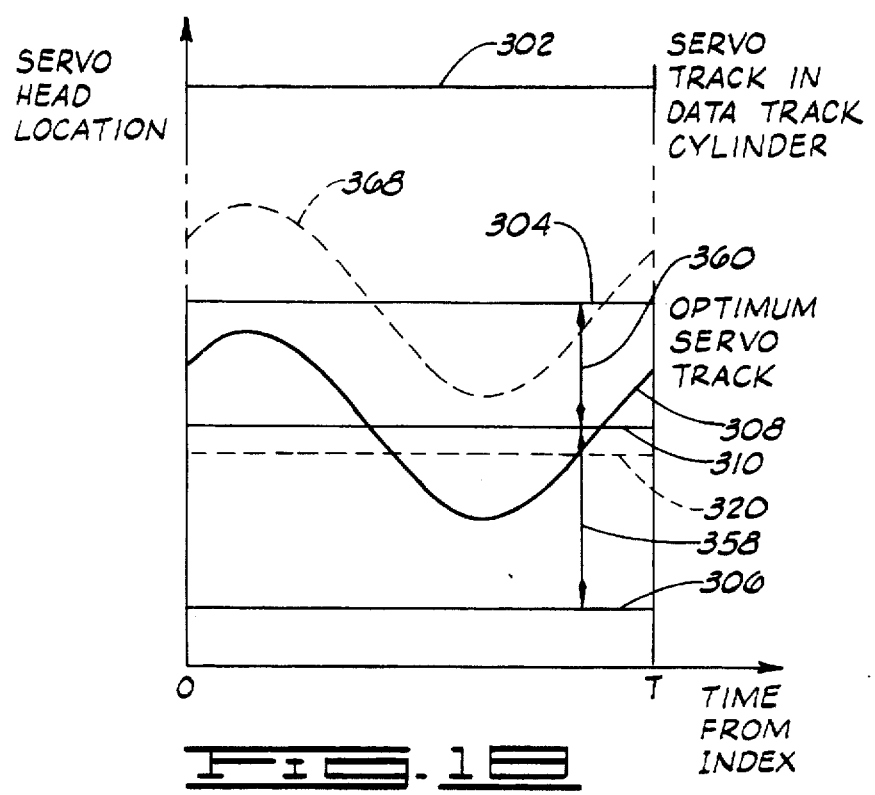

As has been noted, a file is stored on selected data tracks on selected disc surfaces and, accordingly, the disc drive 20 is comprised of a servo system (not numerically designated in the drawings) to maintain radial alignment between the data head currently writing or reading data and the selected data track on the data surface proximate such data head. The present invention contemplates that the servo system is of the type in which one surface of one disc, the surface 64 in FIGS. 1 and 2, is selected as a dedicated servo surface to which servo information is written at the time of manufacture of the disc drive 20. As more fully described in the aforementioned U.S. patent application Ser. No. 738,053, the dedicated servo surface 64 is angularly divided into a plurality of servo frames, one of which has been partially illustrated and designated by the reference numeral 66 in FIG. 2, that includes a position field 68 to which servo dibits 70 are written in a pattern of repeating subfields to define a series of concentric servo tracks, five of which have been illustrated in FIG. 2 and indicated by the reference numerals 71, 73, 75, 77 and 79 therein. (For clarity of illustration, only one repetition of the subfields has been shown in FIG. 2. As disclosed in the aforementioned U.S. patent application Ser. No. 738,053, the servo dibit pattern may be repeated a larger number of times in the position field 68. Similarly, the servo pattern need not have the specific form that has been illustrated in FIG. 2. Rather, such form and the reference to U.S. patent application Ser. No. 738,053 have been presented in the spirit of providing a concrete example that will facilitate an understanding of the invention.) Each servo frame is further comprised of an address field 72 containing a plurality of address dibits 81 which provide Gray code addresses for each of the servo tracks as has also been described in the aforementioned U.S. patent application Ser. No. 738,053.

Corresponding to the designation of the disc surface 64 as a dedicated servo surface, the head 74 (FIG. 1) proximate the surface 64 is a servo head which responds to passage of the servo frames to generate position signals indicative of the radial location of the servo head 74 for positioning the actuator 44 for following servo tracks as will be described below. As in the case of the data heads, the servo head 74 is mounted on the actuator 44 via a support arm 83. Since all of the heads are mounted on the actuator 44, data track following by a data head 40 can be effected by organizing the data tracks, such as the data track 38 in FIG. 1, into concentric cylinders 76, one of which has been illustrated in dashed line in FIG. 1, which each contain a servo track and, as practiced into conventional data track following, causing the servo head to follow the servo track in the same cylinder as a data track to be followed by a selected data head. In the present invention, the data tracks are organized in concentric cylinders as in the prior art but data track following differs from prior art data track following in a manner that will be discussed below.

With continuing reference to FIG. 1, signals generated in the servo head 74 are transmitted on a signal path 85 to a servo logic IC 78 which samples the position and address fields of successive servo frames, as will be discussed below, and provides the samples to a servo microprocessor 84 for repetitive calculation of an actuator correction signal used to reposition the servo head with respect to the servo tracks to maintain data track following by a selected data head while data is written to or read from the data surface proximate the selected data head. Specifically, the actuator 44 is comprised of a coil 80 that is immersed in a magnetic field and the actuator correction signals are outputted to the servo logic IC 78 for transmission to a power transconductance amplifier 82 that drives a current through the coil 80 in relation to the actuator correction signals to give rise to a force on the actuator 44 in accordance with the familiar Lorentz relation.

As is conventional in the art, the servo microprocessor 84 responds to commands issued by the system microprocessor 60 via the system logic IC 62 so that any cylinder can be accessed and subsequently followed by appropriate commands issued to the servo microprocessor 84. To this end, the system logic IC 62 includes a communications circuit (not shown); for example, the communications circuit described in the aforementioned U.S. patent application Ser. No. 738,053, by means of which commands are issued to the servo microprocessor 84 along with parameters used to carry out the commands. Similarly, the communications circuit is used to report the completion of commands by the servo microprocessor 84 and transmit parameters measured in response to commands to be discussed below to the system microprocessor 60.

Conventionally, the system microprocessor 60 implements the writing of a file to a selected data track on a selected disc surface by commanding the servo microprocessor 84 to move the servo head 74 to the servo track in the cylinder that contains the selected data track and, after the servo head 74 has reached such cylinder and stable track following by the servo head 74 has been achieved, by selecting the data head proximate the selected data surface for writing the file and issuing commands to the interface circuit 48 and the read/write IC 56 to cause transfer of the file to the head select logic 58 and thence to the data head proximate the selected data surface. In the present invention, writing of a file is carried out in the same manner excepting only in the selection of a servo track to be followed during writing of the file. As will be discussed more fully below, the present invention contemplates that the servo track that is followed during writing of a file will be an optimum servo track that can be displaced an integral number of track spacings from the servo track in the cylinder that contains the selected data track by a track offset that will compensate for misalignment of the servo head and the data head that exceeds a track spacing. Reading of a file differs from writing only in that the selected data head provides a source of data that is transferred to the read/write IC 56 and, ultimately, to the host 50.

Figure 3:
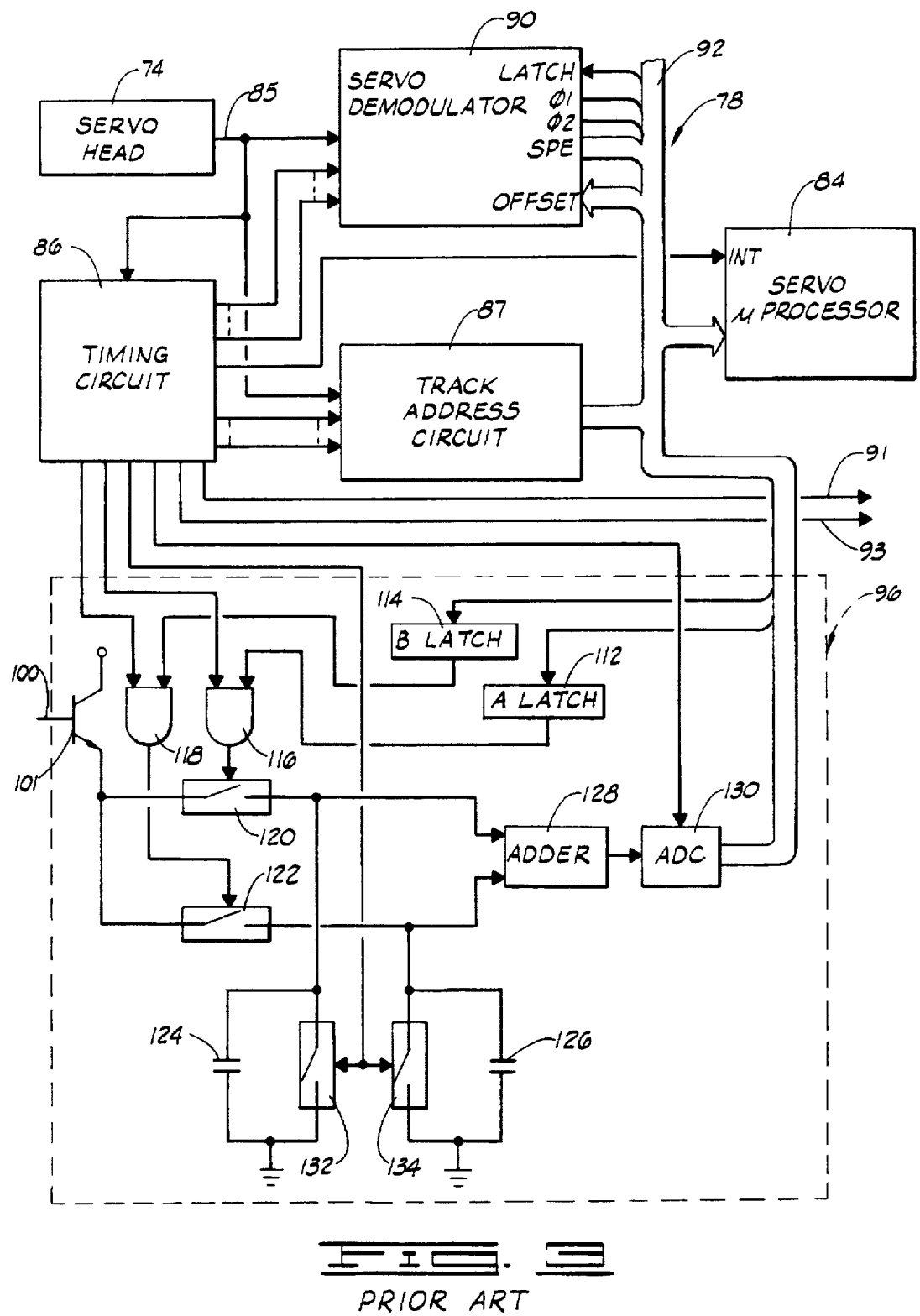
FIG. 3 is a block diagram of the servo system of the disc drive of FIG. 1.

Referring now to FIG. 3, shown therein are portions of the servo logic IC 78 that are relevant to the present invention. The servo logic IC 78 is generally comprised of a timing circuit 86 that receives signals induced in the servo transducer 74 on the signal path 85 and locks onto such signals, in a manner that has been described in the aforementioned U.S. patent application Ser. No. 738,053, to divide each servo frame into a succession of time intervals that are directly related to the location of the servo transducer 74 within each frame. More particularly, the timing circuit 86 generates timing signals that are transmitted to a servo demodulator 90, more fully described in the aforementioned U.S. patent application Ser. No. 738,053, that samples the radial location of the servo transducer 74 as the position field 68 passes the servo transducer 74 and generates a servo position error (SPE) that can be placed on the data bus 92 of the servo microprocessor 84 for input into the microprocessor 84.

Before continuing with the description of the servo logic IC 78, it will be useful to briefly describe selected features of the servo demodulator 90 described in the aforementioned U.S. patent application Ser. No. 738,053 that can be utilized in the practice of the present invention as described below. It will, of course, be recognized that the description of these features is not intended to be limiting; rather, they are described in the spirit of providing a concrete example that will facilitate an understanding of the invention.

One feature is a capability for measuring the servo position error with respect to a servo offset that is transmitted to the servo demodulator 90 from the servo microprocessor 84. This servo offset is subtracted from the measured location of the servo head 74 that is transmitted to the servo microprocessor 84 so that corrections signals determined on the basis of the servo position error received by the servo microprocessor 84 will cause the servo head 74 to follow a path on the servo surface that is displaced from the track center of the servo track with respect to which the servo position error is measured.

A second feature of the demodulator 90, as described in the aforementioned U.S. patent application Ser. No. 738.053 that can be effectively exploited in the practice of the present invention is a capability of operation in two modes: (1) an unlatched mode in which raw servo position error, from which the servo offset is subtracted, is measured from the servo track nearest the servo head at the time the position field passes the servo head; and (2) a latched mode in which the raw servo position error is measured from the servo track nearest the servo head 74 at the time latching occurs.

A final feature that finds use in the present invention is the generation of phase signals, φ1 and φ2 during passage of the position field that can be used to correct servo track addresses determined by a track address circuit 87, suitably the track address circuit described in the aforementioned U.S. patent application Ser. No. 738,053, as the address field of each frame passes the servo head 74. The manner in which these phase signals are generated and used to correct track addresses has been described in the aforementioned U.S. patent application Ser. No. 738,053. In the present invention, such correction is utilized, in the same manner that has been described for track seeking in said patent application, to permit determination of the address of the servo track nearest the servo head 74 at the time that the servo demodulator is placed in the latched mode of operation for a purpose that will become clear below.

Additionally, the timing circuit 86 provides an interrupt signal to the servo microprocessor 84 that indicates completion of passage of each servo frame 66 by the servo head 74; that is, as the dashed line 94 in FIG. 2 passes the servo head 74. As will be discussed below, servo operations are carried out by the servo microprocessor 84 in an interrupt program so that, each time a frame 66 passes the servo head, the location of the servo head 74 with respect to the servo tracks is determined and used to generate an appropriate actuator correction signal that is outputted to the servo logic IC 78 to cause the amplifier 82 to adjust the current through the actuator coil 80 in a manner that will, subject to any offset received by the demodulator 90, correct misalignment between the servo transducer 74 and a servo track being followed.

In accordance with the present invention, the servo logic IC 78 is further comprised of a thermal calibration circuit 96 that receives signals from a data head that is selectable by the system microprocessor 60 via control signals transmitted to the head select logic 58 shown in FIG. 1. To this end, the signal path 98 (FIG. 1) that serially transmits data signals between the read/write IC 56 and the transducer select logic 58 is tapped via a signal path 100 that has been shown in FIG. 1 and carried into FIG. 3. The signal path 100 extends to the base of a transistor 101 whose collector is connected to the disc drive power supply (not shown) so that the transistor will produce a signal at its emitter that is proportional to the amplitude of signals induced in any data transducer selected by the system microprocessor 60.

In the practice of the invention, the signals on the signal path 100 are sampled at selected times in relation to the servo frames as will now be described with respect to FIG. 2. As shown for the data surface 36, a thermal calibration track 102 is written to each data surface at the time of formatting of the disc drive 20 in the cylinder that includes the servo track 79 on the dedicated servo surface 64. As in the case of the servo tracks, the thermal calibration tracks are divided into frames, one of which has been indicated at 104 in FIG. 2, and each frame 104 of the thermal calibration track is radially aligned with a servo frame on the dedicated servo surface 64. Thus, the end of each thermal calibration frame 104, indicated by the dashed line 107, will become radially aligned with the data transducer proximate the data surface 36 at substantially the same time that the end of a servo frame reaches the servo transducer 74 and the servo microprocessor 84 is interrupted.

As in the case of the servo tracks, the thermal calibration tracks are written in a pattern that permits sampling of the radial locations of the data transducers with respect to the centers of the thermal calibration tracks via the sampling of signals appearing on the signal path 98 between the read/write IC 56 and the transducer select logic 58. More particularly, each frame of the thermal calibration tracks is comprised of an A burst pattern 106 and a B burst pattern 108 that each extend along disjoint portions of the thermal calibration track on opposite sides of track center. The burst patterns are each comprised of a radial series of circumferentially extending blocks, as indicated at 109 and 111 for the A burst pattern 106, that, in turn, are each comprised of a circumferential series of oppositely magnetized cells 110. The cells 110 will each induce an emf pulse in a data head proximate the data surface to which the bursts are written as each boundary between successive cells passes the head and, moreover, the amplitudes of these pulses generally reflect the extent to which data transducers overlap the burst patterns. Thus, since the A and B burst patterns are on opposite sides of the thermal calibration track center, the relative amplitudes of the emf pulses induced in a data head by passage of the burst patterns by the head will provide a measure of the radial location of the data head with respect to the center of the thermal calibration track.

The A and B burst patterns are written during formatting by a conventional burst writer 89 (FIG. 1) under the control of timing and clock signals received from the timer 86 when the burst writer 89 is enabled by the system microprocessor 60 via the system logic IC 62. More particularly, the timing circuit 86 provides clock signals on a signal path 91 that will cause the burst writer, when enabled, to generate a toggled output, transmitted to the signal path 98 between the read/write logic IC 56 and the head select logic 58, during intervals determined by the timing signals provided by the timing circuit 86 on a signal path 93. Thus, the burst patterns 106 and 108 can be positioned to circumferentially align the thermal calibration frames with the servo frames by appropriate choice of timing signals transmitted from the timing circuit 86 to the burst writer 89. The radial structure of each burst pattern is achieved by first writing a burst adjacent to the thermal calibration track 102 and then writing bursts centered on data tracks to the same side of the thermal calibration track as the initial burst pattern; for example, to the tracks 93 and 95 in FIG. 2 for the A burst pattern 96. The purpose of the radial extension of the burst patterns will become clear below.

Returning to FIG. 3, the thermal calibration circuit 96 is comprised of A and B latches, 112 and 114 respectively, that permit selective reading of the A and B bursts by a data head under the control of the servo microprocessor 84 during passage of each servo frame 66 by the servo head 74. To this end, the latches 112 and 114 receive single bits from the servo microprocessor 84, at times that will be discussed below, that are used to enable AND gates, 116 and 118 respectively, that receive timing signals from the timing circuit 86 as A and B burst patterns, respectively, on the data surfaces pass the data heads proximate the data surfaces. The outputs of the AND gates 116 and 118 are connected to control inputs of switches 120 and 122, respectively, whose inputs are connected to the emitter of the transistor 101. Thus, emfs generated in a data head selected by the system microprocessor 60 via a control word transmitted to the system logic IC 62 to cause selection of the data head by the head select logic 58 can be selectively transmitted by the switches 120 and 122 to capacitors 124 and 126, respectively, to peak detect bursts generated by passage of the selected data head by a selected burst pattern. More particularly, at such times that the data head 40 has been selected by the system microprocessor 60, an A burst arising by passage of the data head 40 by the A burst pattern 106 on the disc surface 36 will be peak detected by transmitting a logical one to the A latch 112 so that the switch 120 will be closed as the A burst pattern passes the data head 40 by a timing signal from the timing circuit 86. B burst patterns can similarly be peak detected by transmitting logical ones to the B latch 114.

The outputs of the switches 120 and 122 are also connected to the inputs of an adder 128 whose output is connected to an analog to digital converter 130 which digitizes the output of the adder 128 in response to a timing signal from the timing circuit 86 and presents the digitized sum to the data bus 92 of the servo microprocessor 84. Thus, the A and B burst patterns on any selected data surface can be individually peak detected to provide information indicative of the location of the data head proximate the selected data surface in a manner and for a purpose that will become clear below. Prior to peak detection of either burst pattern, the capacitors are discharged by switches 132 and 134 respectively that are closed by a timing signal transmitted from the timing circuit 86 as the A burst pattern of each frame of the thermal calibration track on each data surface approaches the data head proximate such surface.

Disc Drive Operation

Figures 4, 5, 6:
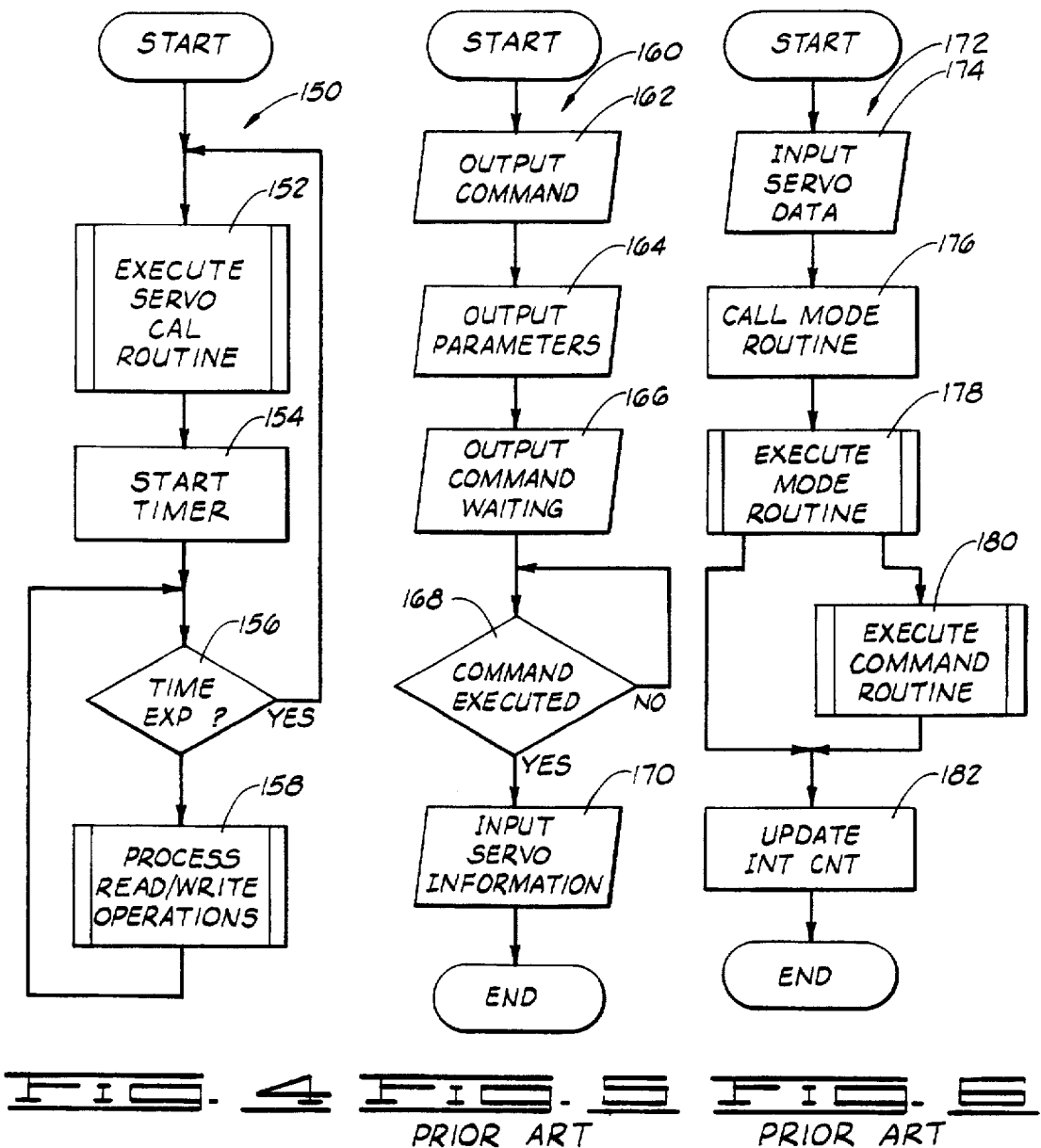
FIG. 4 is a flow chart of the system microprocessor main program.
FIG. 5 is a flow chart of the system microprocessor servo command program.
FIG. 6 is a flow chart of the servo microprocessor interrupt program.

Referring now to FIG. 4, shown therein and designated by the general reference numeral 150 is a flow chart of relevant portions of the main program executed by the system microprocessor 60 when the disc drive 20 is placed into operation. As shown in FIG. 4, the system microprocessor is programmed to execute a servo calibration routine, step 152, upon disc drive start-up and then start an internal timer, step 154, for repetition of the servo calibration routine from time-to-time. As will be discussed more fully below, the execution of the servo calibration routine generates a track offset that indicates an optimum servo track on the dedicated servo surface 64 for guiding the servo head 74 and coefficients of a thermal calibration relation for offsetting the servo head from the optimum servo track to cause a selected data head to follow a selected data track on the data surface proximate the selected data head without offset.

Following the timing step 154, the system microprocessor 60 repetitively polls the time that has elapsed since the timer was started, step 156, and, if the time selected for repetition of the servo calibration routine has expired, the main program returns to set 152 to again execute the servo calibration routine. The time between executions of the servo calibration routine is selected such that the track offset and thermal calibration relation will, at all times, cause the data heads to follow the data track with a negligible offset that will not interfere with storage and retrieval of computer data files. While such time will vary from disc drive to disc drive and with operating conditions, a suitable calibration repetition time will generally be of the order of ten minutes.

Between executions of the servo calibration routine, the system microprocessor 60 responds to commands from the host computer 50 to process read/write operations, step 158, in which files are stored or retrieved from data surfaces on discs of the disc drive 20. More specifically, in response to a command from the host computer 50 to store a file, the system microprocessor 60 issues commands to the servo microprocessor 84 that will cause the data head that is to read or write the file to be moved to a selected data track to which the file is to be stored or from which the file is to be retrieved and issues a command to the head select logic 58 to enable the data head that is to read or write the file. Once the data head that is to read or write the file is on track, conventional commands are issued to the read/write IC 56 and the interface circuit 48 to cause the transfer of the file between the host computer 50 and the selected data track. Once the file has been transferred, the main program returns to the polling of the timer, step 156, to continue selectively processing read/write operations as required or executing the servo calibration routine.

As will be clear from the above, such method of operation of the disc drive 20 requires coordination of operations carried out by the servo microprocessor 84 with those of the system microprocessor 60 and FIGS. 5 through 10 have been included to provide a basis for discussion of this coordination. In keeping with the spirit of providing a complete disclosure that will facilitate an understanding of the invention, the flow charts in FIGS. 4 through 10 have been presented to illustrate the operation of the disc drive in accordance with the aforementioned U.S. patent application Ser. Nos. 738,053 and 738,584. Thus, the description of the coordination of the servo operations and the manner in which they are carried out are intended to be exemplary rather than limiting.

Referring first to FIG. 5, shown therein and designated by the reference numeral 160 is a flow chart of a general command routine executed by the system microprocessor 60 to issue commands to the servo microprocessor 84, to provide information required by the servo microprocessor 84 to execute the commands, and determine when the commands have been completed. In particular, each of the commands that the servo microprocessor can execute are defined by command words and a command is initiated by outputting the appropriate command word to the system logic IC 62, step 162, for subsequent reading by the servo microprocessor 84 followed by the output, step 164, to the system logic IC 62 of any parameters required by the servo microprocessor 84 to execute the command.

As is known in the art, servo operations are generally implemented by the output of correction signals, determined from servo position error signals generated by the servo demodulator 90, to the servo logic IC 78 by the servo microprocessor 84 and the parameters outputted at step 164 can include the coefficients of control equations used to determine the correction signals as has been described in the aforementioned U.S. patent application Ser. No. 738,053. In the practice of the present invention, the parameters can also include the address of the selected data track to which the file is to be written or from which it is to be read, the track offset that identifies the optimum servo track for following the selected data track and the coefficients of the thermal calibration relation from which servo offsets from the optimum servo track are determined. (As described in the aforementioned U.S. patent application Ser. No. 738,053, it is advantageous to store control and calibration parameters in the system microprocessor 60 and transmit the parameters to the servo microprocessor 84 for use.) Once the parameters have been outputted to the system logic IC 62, the system microprocessor 60 outputs a command waiting control word, step 166, to the system logic IC 62 that is read, as discussed below, by the servo microprocessor 84 to initiate execution of the system microprocessor command. Following the output of the command waiting control word, the system microprocessor 60 repetitively polls the system logic IC 62, step 168, to determine whether the servo microprocessor 84 has executed the command as indicated by a command executed control word outputted to the system logic IC 62 at the conclusion of such execution as will be discussed below.

When the present invention is carried out in a disc drive constructed and operated in the manner described in the aforementioned U.S. patent application Ser. No. 738,053, calibration information determined by the servo microprocessor 84 is outputted to the system microprocessor 60 and the system microprocessor 60 inputs such information, or other information that might be generated in response to a command to the servo microprocessor 84, step 170, following reading of the command complete control word.

As described in the aforementioned U.S. patent application Ser. No. 738,053, servo operations are carried out in interrupts of the servo microprocessor 84 that occur, as described above, as the end of each servo frame 66 reaches the servo head 74. More particularly, servo operations are carried out in accordance with a servo microprocessor interrupt program that has been illustrated by a flow chart 172 in FIG. 6.

Referring to FIG. 6, the interrupt routine commences with the input of servo data, step 174, that has been developed as the servo frame 166 passes the servo head 74. In the practice of the present invention, such servo data includes the servo position error signal and phases, φ1 and φ2 generated by the servo demodulator 90 in response to passage of the position field 68 of a servo frame 66 by the servo head 74, the address of the servo track nearest the servo head 74 at the time of passage of the address field by the servo head 74, from the address circuit 87, and the contents of the analog to digital converter 130 of the thermal calibration circuit 96. Thus, in general, the step 174 provides the information utilized in the execution of servo operations during mode and command routines that are subsequently executed by the servo microprocessor 84 during the interrupt.

Following the input of the servo data, a mode routine is called, step 176, and executed, step 178. As discussed in the aforementioned U.S. patent application Ser. No. 738,053, the mode routines are identified by mode control words so that any of a selection of mode routines can be executed. Mode routines that are pertinent to the present invention are the SPE FINE CONTROL and SPE FINE CONTROL INITIALIZE routines that have been illustrated by a flow chart in FIG. 7 for discussion below. As further discussed in the aforementioned U.S. patent application Ser. No. 738, 053, the execution of a mode routine may, or may not, be followed by the execution of one of a selection of command routines similarly identified by command control words. Whether a command routine is executed in any particular interrupt is determined by the instructions that are carried out during the mode routine. If such instructions include a call for the execution of a command routine, the command routine will be executed as shown at step 180 in FIG. 6 and the command routine will be followed by an update of an interrupt count, step 182, from an index orientation of the discs as described in the aforementioned U.S. patent application Ser. No. 738,053. The interrupt count, which is reset each time the discs pass the index orientation is utilized in the present invention in a manner that will be described below. If no command routine is called in the mode routine that is executed at step 178 of FIG. 6, the mode routine exits to the update of the interrupt count at step 182 following which the servo microprocessor 84 returns to a main program which is not pertinent to the practice of the present invention.

Figure 7:
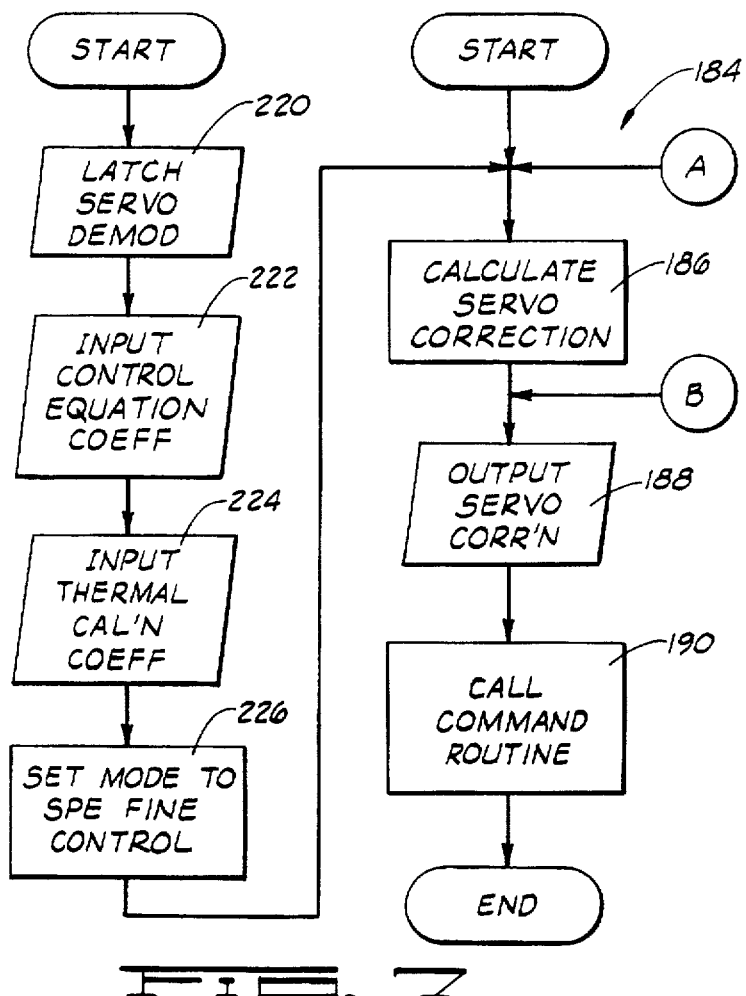
FIG. 7 is a flow chart of the servo microprocessor SPE FINE CONTROL and SPE FINE CONTROL INITIALIZE mode routines.

As indicated above, the mode routines that pertain to the present invention are the SPE FINE CONTROL and SPE FINE CONTROL INITIALIZE routines that have been illustrated by a flow chart 184 in FIG. 7. It will be useful to consider the SPE FINE CONTROL routine at the present point; the SPE FINE CONTROL INITIALIZE routine will be discussed below.

In the SPE FINE CONTROL mode routine, a servo correction signal is calculated, step 186, during each interrupt of the servo microprocessor 84 using the servo position error signal inputted from the servo demodulator 90 at the beginning of the interrupt and control equation coefficients received from the system microprocessor 60 at a time to be discussed below. The servo correction signal, which is calculated to cause the servo head 74 to accelerate toward a servo offset location from the optimum servo track as will be discussed below, is outputted, step 188, to drive the servo head 74 to a location that will cause the data head most recently selected for the storage or retrieval of a file to follow the most recently selected data track without offset. More particularly, once selected data track following by a selected data head has been achieved, such data track following will continue indefinitely until a command is received from the system microprocessor 60 that will cause the mode control word to be changed. Such change is effected by calling a command routine, step 190, following output of the servo correction signal at such time that the command control word that identifies the command routine to be executed is the new command control word that will cause execution of NEW COMMAND command routine illustrated by a flow chart 192 in FIG. 8.

Figure 8:
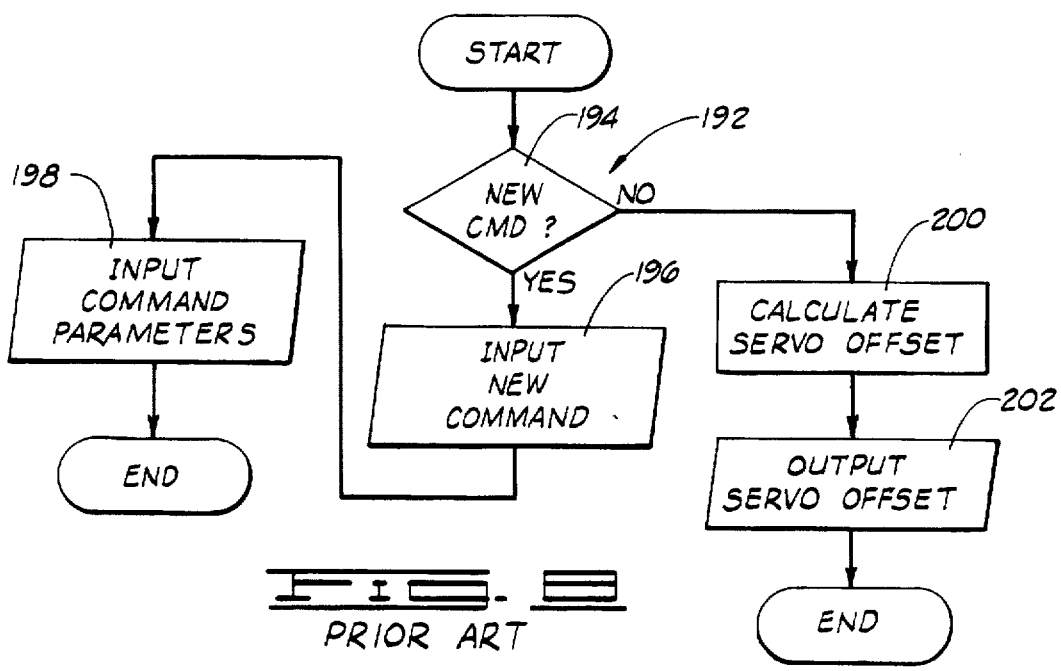
FIG. 8 is a flow chart of the servo microprocessor NEW COMMAND command routine.

Referring to FIG. 8, the NEW COMMAND command routine begins with the polling of the system logic IC 62 to determine whether the system microprocessor 60 has outputted a new command to the system logic IC 62, step 194, and, if so, the command is inputted, step 196, along with any parameters needed to begin execution of the command, step 198. A command which pertains to he present invention is the seek command which will cause the servo microprocessor 84 to execute the SEEK command routine that has been illustrated in FIG. 9. The SEEK command routine will be discussed below. Following input of any parameters that may be required to commence the execution of the SEEK command routine in subsequent interrupts of the servo microprocessor 84, the NEW COMMAND command routine ends to cause the servo microprocessor to exit to the interrupt count update, step 182 of FIG. 6, as noted above.

Should no new command be waiting in the servo logic IC, a servo offset is calculated, step 200, and outputted, step 202, to the servo demodulator 90. Such offset is an amount the servo head 74 should be offset from the optimum servo track to cause the most recently selected data head to align with the most recently selected data track and is calculated from a thermal calibration relation having the general form:

$$SERVO\ OFFSET = DC + SIN \sin(2\pi n/N) + COS \cos(2\pi n/N) \qquad (1)$$

where DC, SIN and COS are constant coefficients measured during the execution of a servo calibration routine (step 152, FIG. 4) as will be described below, n is the interrupt count from index for the current interrupt, and N is the total number of servo frames along each servo track on the dedicated servo surface. Following output of the servo offset, the command routine exits to interrupt count update at step 182 of FIG. 6.

Before continuing, it will be useful to briefly summarize the operation of the servo system during data track following. As the position field of a servo frame passes the servo head 74, the servo pattern on the dedicated servo surface is sampled by the servo demodulator 90 to provide a raw servo position error signal. The servo offset outputted by the servo microprocessor 84 to the servo demodulator 90 during the interrupt that is executed as the frame passes the servo head 74 is subtracted from the raw servo position error signal to obtain the servo position error signal that will be inputted in the interrupt that will occur when the end of the frame reaches the servo head 74. When this interrupt occurs, the correction signal is calculated and outputted to the servo logic IC 78 to correct the location of the servo head 74 and the servo offset to be subtracted from the raw servo position error signal as the position field next passes the servo head 74 is calculated and outputted to the servo demodulator 90. Thus, in each interrupt of the servo microprocessor 84, data necessary to locate the servo head 84 with respect to the optimum servo track, selected as will be discussed below, is read and used to correct the location of the servo head 74 and, consequently, the data head most recently selected to follow a selected data track.

An important aspect of this general method for carrying out track following operations is that the servo position error that is inputted to the servo microprocessor 84 is not the raw servo position error signal that is obtained by sampling the servo pattern on the dedicated servo surface. Rather, the inputted servo position error signal received by the servo microprocessor is an adjusted value that will be zero only if the servo head is displaced from the optimum servo track by the amount that is given by the thermal calibration relation recited above. Thus, since the correction signal is determined from the servo position error signal that is inputted at the beginning of each interrupt of the servo microprocessor 84, the servo head 74 will be caused to follow a sinuous path determined by the coefficients SIN and COS in equation (1) that is offset from the optimum servo track by an amount determined by the value of DC in equation (1). The manner in which these coefficients are selected to cause data track following will be discussed below.

As has been noted above, during selected data track following by a selected data head, the servo head 74 will follow, with a servo offset given by equation (1), an optimum servo track that will enable the servo system to correct for misalignments of the servo and data heads that exceed a track spacing. The manner in which the optimum servo track is accessed for this purpose has been illustrated in FIGS. 9 and 10 to which attention is now invited.

A seek to the optimum servo track for following a selected data track on a selected data surface is initiated by a seek command issued by the system microprocessor 60 to the servo microprocessor 84 via the system logic IC 62. Such command will be accompanied with the output of the address of the data track that is to be followed and the track offset that determines the address of the optimum servo track, for the selected data surface, from which the servo head 74 is to be offset, in accordance with the thermal calibration relation recited above, to cause the data head on a selected data surface to follow, without offset, the designated data track. Other parameters that are outputted to the servo microprocessor 84 will be noted below.

Since the servo microprocessor 84 continues to repetitively execute the SPE FINE CONTROL mode routine and the NEW COMMAND command routine indefinitely once data track following has been initiated, the servo microprocessor 84 will execute the SPE FINE CONTROL mode routine for a data track currently being followed and then input the new command as has been described above with respect to FIG. 7. In the next interrupt of the servo microprocessor 84, the servo microprocessor 84 will again execute the SPE FINE CONTROL mode routine and then execute the SEEK command routine that has been illustrated by a flow chart, 204, in FIG. 9. In the SEEK command routine, the mode control word is changed to call for the execution of a SEEK INITIALIZE mode routine, step 206, and the command routine control word is changed to call for the execution of an ONTRACK command routine, step 208, in the next interrupt.

The SEEK INITIALIZE mode routine that is executed in the next interrupt of the servo microprocessor 84 has been illustrated by the flow chart 210 presented in FIG. 10. In this mode routine, the address of the data track to be followed after the seek has been completed is inputted from the system logic IC 62, step 212, and followed by the input of the track offset, step 214, that indicates the displacement of the optimum servo track for following the selected data track from the servo track in the cylinder that includes the selected data track. The optimum servo track is then determined, step 216, by adding the track offset to the address of the selected data track and replacing the address of the selected data track with that of the optimum servo track in the servo microprocessor 84 memory. The servo microprocessor then carries out, during a series of interrupts, a conventional seek, indicated at 218, to the new data track address; that is, to the optimum servo track. The manner in which the seek is carried out has been fully described in the aforementioned U.S. patent application Ser. No. 738,053, the teachings of which have been incorporated herein by reference, so that the seek need not be described for purposes of the present disclosure. Rather, it will suffice to note that the seek terminates with a return to the NEW COMMAND command routine that has been illustrated in FIG. 8, with the output of a command complete signal to the system microprocessor 60, and with the execution of the SPE FINE CONTROL INITIALIZE mode routine that has been illustrated in FIG. 7.

Referring once again to FIG. 7, the SPE FINE CONTROL INITIALIZE mode routine commences with latching of the servo demodulator 90, step 220, that will cause the servo position error in succeeding interrupts to be determined with respect to the servo track to which the seek has been made as has been described in the aforementioned U.S. patent application Ser. No. 738,053. In the practice of the present invention, in contrast to conventional seek operations, such servo track will be the optimum servo track for following the selected data track.

After the servo demodulator 90 has been latched, coefficients for determining the correction signals to be outputted to the servo logic IC 78 from the servo position error signals read from the servo demodulator 90 are inputted, step 222, from the system logic IC 62 and followed by the input, step 224, of the coefficients of the thermal calibration relation for the selected data surface. The mode control word is then changed to SPE FINE CONTROL, step 226, so that, in subsequent interrupts, the SPE FINE CONTROL mode and NEW COMMAND command routines will be carried out with the servo head 74 being offset from the optimum track in accordance with the thermal calibration relation that has been previously measured for the selected data surface in the execution of the servo calibration routine 152. It is to the measurement of the track offsets and thermal calibration relation coefficients for each of the data surfaces that we now turn.

Servo Calibration

Figure 11:
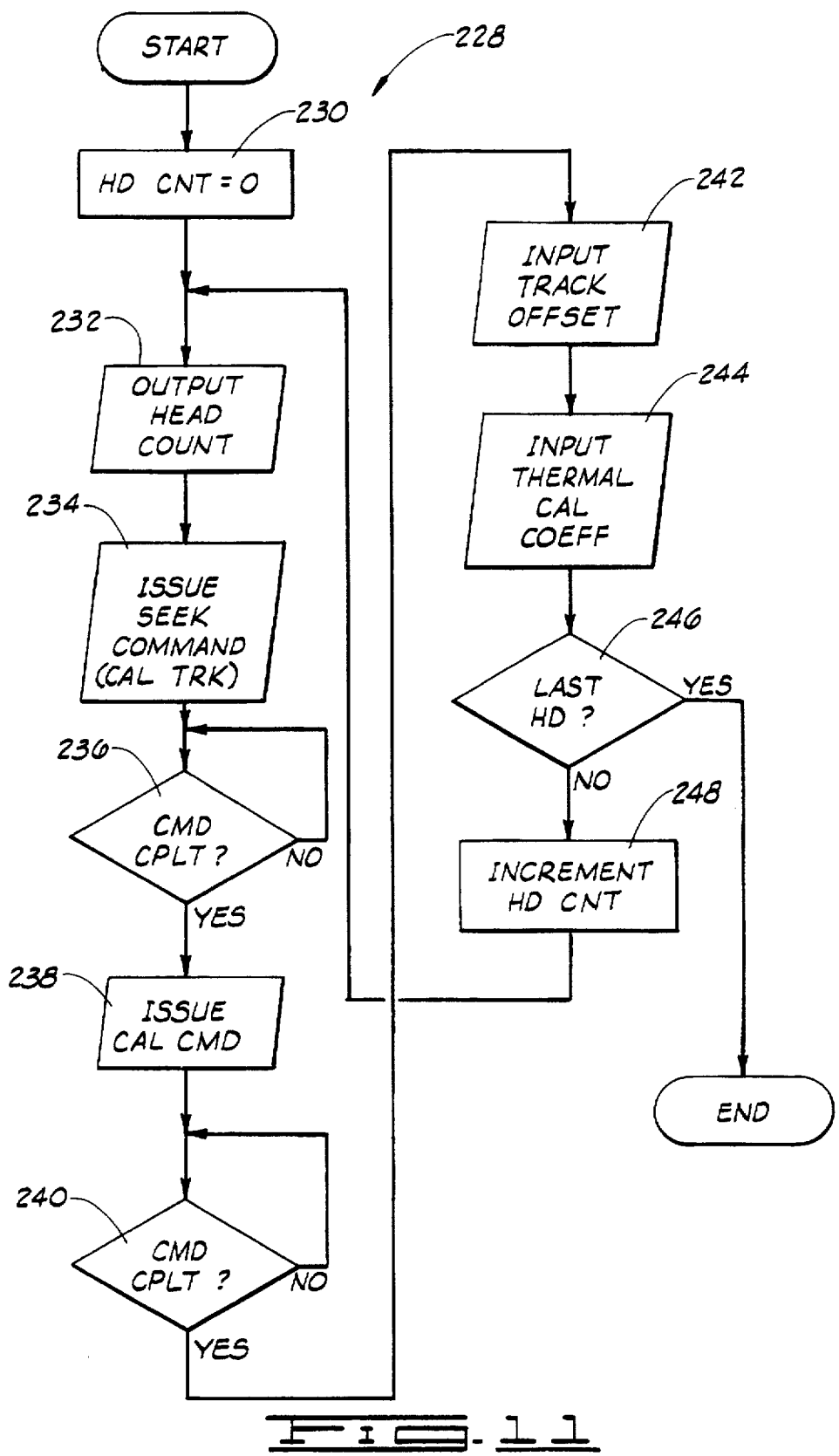
FIG. 11 is a flow chart of the system microprocessor SERVO CALIBRATION routine.

Referring now to FIG. 11, shown therein is a flow chart, designated 228, of the servo calibration routine 152 executed from time to time by the system microprocessor 60 as has been noted above. As in the case of other routines executed by the system microprocessor 60, the servo calibration routine 152 is implemented by the execution of mode and command routines that are carried out during interrupts by the servo microprocessor 84 and such mode and command routines have been illustrated by flow charts in FIGS. 12 through 17 and by a graph that illustrates the location of the servo head 74 during a complete revolution of the discs in FIG. 18.

Before describing the system microprocessor servo calibration routine and the servo microprocessor mode and command routines executed in the implementation of the servo calibration routine, it will be useful to note that track offsets and thermal calibration relations are determined for all data heads and their associated data surfaces. As will be clear to those of skill in the art, the purpose of the servo calibration and the subsequent use of the track and servo offsets is to compensate for misalignments between servo tracks and data tracks and the servo head and the data heads that vary from one data head and surface to the next. Hence, each data surface and its associated data head must be independently calibrated.

Accordingly, the first step in the servo calibration routine 228 is to initialize a head count, step 230, to maintain a record of the data heads that have been calibrated. This head count is outputted, step 232, to the head select logic 58 to select the data head and surface to be calibrated so that emfs induced in the head so selected by passage of magnetization reversals on the selected data surface by the selected data head will be transmitted to the transistor 101 via the signal path 100 as has been described above.

Once a data head and data surface to be calibrated have been selected, the system microprocessor 60 outputs a seek command, step 234, to the servo microprocessor 84 to cause the servo microprocessor to seek to the servo track in the same cylinder as the calibration tracks 102 on the data surfaces. Accompanying the issuance of such seek command, the servo microprocessor outputs a track offset of zero and values for the coefficients of the thermal calibration relation; that is, DC, SIN and COS, that are similarly selected to be zero. Thereafter, the system microprocessor will repetitively poll the system logic IC 62 to determine, step 236, whether the servo microprocessor 84 has reported the completion of the seek.

In response to the seek command, the servo microprocessor 84 will execute the mode and command routines described above to execute a seek by the servo head 74 from the track currently being followed to the servo track, which, because of the zero track offset, will be in the same cylinder as the thermal calibration tracks. Once the seek has been completed, the servo microprocessor 84 will issue a command complete signal to the system microprocessor 60 and commence execution of the SPE FINE CONTROL mode routine and the NEW COMMAND command routine to cause the servo head 74 to follow the servo track in the same cylinder as the thermal calibration tracks with a servo offset which, because of the zero values of the coefficients DC, SIN and COS, will be zero. Thus, with the exception of the values of the track offset and the thermal calibration relation coefficients, the seek that is commanded at step 234 is executed in the same manner that seeks are executed to access files for the computer 50.

Once the command complete signal has been received from the servo microprocessor 84, the system microprocessor 60 will issue a calibration command, step 238, to the servo microprocessor 84 to cause the servo microprocessor to execute mode and command routines that will result in the measurement of the track offset and thermal calibration relation coefficients for the selected data head and data surface that will be described below. As will also be described below, at the conclusion of the measurements, the servo microprocessor 84 will output the measured values and a command complete signal to the system microprocessor 60, via the system logic IC 62.

When the system microprocessor 60 detects the command complete signal, step 240, the track offset and thermal calibration relation coefficients that have been measured for the selected data track and selected data surface are inputted, steps 242 and 244 respectively, from the system logic IC 62 by the system microprocessor 60 and stored in RAM for use in subsequent seeks to data tracks on the selected data surface in the manner that has been described above. The head count is then checked to determine whether all data heads and surfaces have been calibrated, step 246, and if so, the servo calibration routine ends. If not, the head count is incremented, step 248, and the system microprocessor 60 outputs of the new head count, step 232, to repeat the measurements for the new data head and surface. Thus, by selecting each data head and surface in turn and issuing seek and calibration commands following each selection, the system microprocessor 60 causes the servo microprocessor 84 to initially cause the servo head to seek to the servo track in the cylinder containing the thermal calibration tracks and, once the seek has been competed, measure the track offset and thermal calibration relation coefficients for each of the data heads and surfaces in turn.

The seeks of the servo head to the servo track in the same cylinder as the thermal calibration tracks is carried out as has been described above; FIGS. 12 through 18 illustrate the manner in which track offset and thermal calibration relation coefficients are measured for each of the data heads and surfaces.

In response to the reception of the calibration command from the system microprocessor 60, the servo microprocessor 84 will execute a CALIBRATION command routine illustrated by the flow chart 250 in FIG. 12 in the interrupt following input of the calibrate command. In this routine, a servo offset of zero is outputted to the servo demodulator 90, step 252, and the servo demodulator 90 is unlatched, step 254, so that the servo position error that will be generated by servo head sampling of the position field as each servo frame passes the servo head will be a measure of the displacement of the servo head from the servo track nearest the servo head 74 as passage of the servo frame occurs. A frame count is then initialized to zero, step 256, and the AND gates 116 and 118 (FIG. 3) that transmit timing signals to the switches 120 and 122 of the thermal calibration circuit 96 are disabled to turn off peak detection of A and B bursts generated by passage of the burst patterns 106 and 108 (FIG. 2), by the selected data head, steps 258 and 260. The command control word is then changed, step 262, to call for the execution the CALIBRATION INITIALIZE command routine in the next interrupt of the servo microprocessor. (As will be clear from the above discussion of the interrupt program of the servo microprocessor 84 and the entry of the SPE FINE CONTROL mode control word at the end of a seek, the CALIBRATION command routine shown in FIG. 12 will be preceded by the execution of the SPE FINE CONTROL mode routine with zero thermal offset from the servo track in the cylinder which contains the thermal calibration tracks.)

In three ensuing interrupts of the servo microprocessor 84, the SPE FINE CONTROL mode routine will be executed and followed with the CALIBRATION INITIALIZE command routine that has been illustrated by the flow chart 264 in FIG. 13. In these interrupts, the frame count, initialized to zero at step 256 of the CALIBRATION command routine 250, is checked, step 266, to determine whether three interrupts have occurred since the AND gates 116 and 118 were disabled, to turn off the reception of A and B bursts signals by the thermal calibration circuit 96, in the last execution of the CALIBRATION command routine and, if not, the frame count is incremented, step 267, for a new check of the frame count in the next interrupt of the servo microprocessor 84. In the third interrupt in which the CALIBRATION INITIALIZE command routine is executed, the value in the analog to digital converter 130 is stored, step 268, as a calibration offset that is utilized to insure the determination of accurate values for the track offset and thermal calibration relation coefficients as will now be explained.

As has been discussed above, the analog to digital converter 130 responds to signals from the timing circuit 86

(FIG. 3) to enter the output of the adder 128 whose inputs, when the AND gates 116 and 118 are enabled, are the peak detected A or B bursts received from the selected data head. As will be discussed below, alternate A and B burst peaks are utilized to guide the actuator 44 while the measurement of the track offset and thermal calibration relation coefficients takes place so that errors in the burst peak values, arising from electronic offsets in the thermal calibration circuit 96, will result in faulty actuator guidance during these measurements and, consequently, erroneous values for the track offset and thermal calibration relation coefficients if no compensation for these electronics offsets is made. The purpose of storing the contents of the analog to digital converter 130 in the third execution of the CALIBRATION INITIALIZE command routine, that is the third execution of a command routine after turning off the A and B bursts at steps 258 and 260 of the previously executed CALIBRATION command routine, is to cause the analog to digital converter 130 to contain a value that can arise only from these electronics offsets. Thus, by storing the value in the digital to analog converter 130 in the third execution of the CALIBRATION INITIALIZE command routine, subsequent successive values of the A and B burst peaks can be corrected to accurately reflect the location of the selected data head in relation to the thermal calibration track on the disc surface adjacent the selected data head. The value in the analog to digital converter 130 for the third execution of the CALIBRATION INITIALIZE command routine, rather than the second, is stored because of the timing of the entry of a burst peak value into the analog to digital converter 130. Specifically, such entry occurs after the value therein for the previous frame has been inputted to the servo microprocessor 84 but before the capacitors 124 and 126 are discharged. Thus, three interrupts of the servo microprocessor 84 following the disabling of the AND gates 116 and 118; that is, after turning off the A and B bursts, are required to ensure that the value in the analog to digital converter 130 is a value corresponding to zero input to the thermal calibration circuit 96.

Once the calibration offset has been stored, the mode control word is changed to DSPE FINE CONTROL, step 270, which will initiate actuator guidance with respect to the thermal calibration track on the selected data surface, the command control word is changed to ACCUMULATE INITIALIZE, step 272, which will result in initialization of the measurement of the track offset and thermal calibration relation coefficients in subsequent executions of command routines, and a DSPE count is initialized to zero, step 274.

Figure 14:
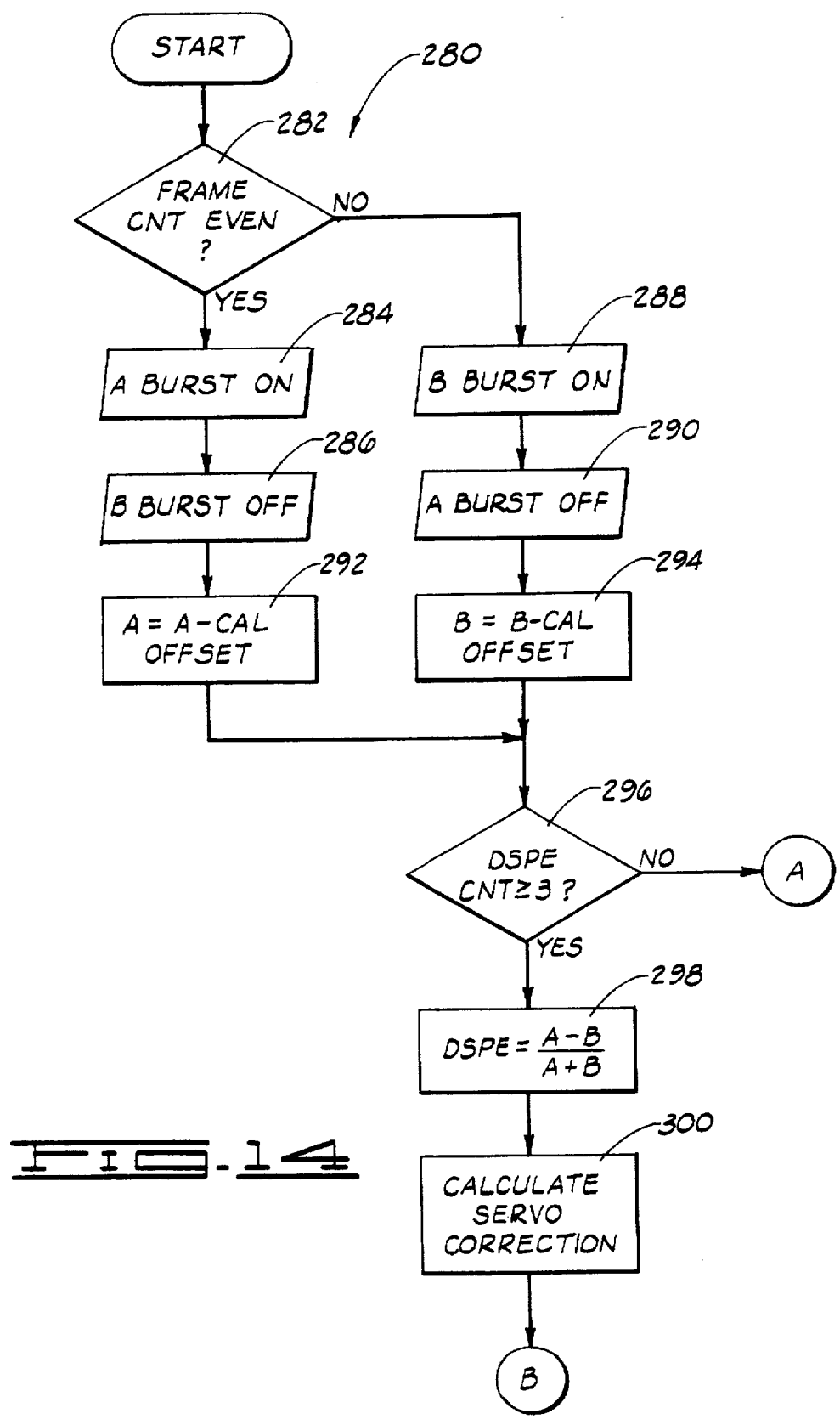
FIG. 14 is a flow chart of the Servo Microprocessor DSPE FINE CONTROL Mode Routine.

The DSPE FINE CONTROL mode routine that is executed in each servo microprocessor interrupt while data is collected for the determination of the track offset and thermal calibration relation coefficients has been illustrated by the flow chart 280 if FIG. 14. In this routine, in which the peak detected A and B bursts are used to guide the actuator 44, the parity of servo frames which, as noted above, are counted from an index orientation of the discs, is used to alternately read A and B burst peaks to obtain a data servo position error (DSPE) that is used to guide the actuator 44. To this end, each DSPE FINE CONTROL mode routine execution begins with a parity check, step 282, of the frame count and selects alternative, but equivalent, succeeding steps for even and odd parity. Specifically, if the frame count is even, the A burst is turned on, step 284, by enabling the AND gate 116 via the A latch 112 in FIG. 3, and the B burst is turned off, step 286, by disabling the AND gate 118 via the B latch 114. Thus, during the passage of a frame during which the DSPE FINE CONTROL mode routine is executed, the A burst signal from the selected data head will be peak detected while the A burst pattern passes the selected data head. Conversely, if the frame count is odd, a B burst signal will be peak detected by turning on the B burst, step 288, while turning off the A burst, step 290. The burst peak that has been inputted at the beginning of an interrupt in which the DSPE FINE CONTROL mode routine is executed is then adjusted for electronic offsets in the thermal calibration circuit 96, by subtraction of the calibration offset, step 292 or 294 as appropriate.

Thus, during passage of alternate servo frames by the servo head 74, the A and B burst patterns on the selected data surface are alternatively sampled; more specifically, peak detected, and the peak value for each sample is presented to the input of the adder 128 to be entered into the analog to digital converter 130 for input, during passage of the next frame, into the servo microprocessor 84 where it is corrected for thermal calibration circuit electronic offset. Accordingly, with the third execution of the DSPE FINE CONTROL mode routine and for all subsequent executions thereof, the servo microprocessor 84 will contain stored values of the A and B burst peak heights that, together, provide a measure of the location of the selected data head with respect to the thermal calibration track on the selected data surface.

These stored values of the A and B burst peak heights are used to guide the actuator 44 by using the A and B burst peak heights to determine a data servo position error that replaces the servo position error generated by the servo demodulator 90 to determine the correction signal outputted to the servo logic IC 78 to determine the current passed through the actuator coil 88 by the power amplifier 82. To this end, the execution of the DSPE FINE CONTROL mode routine continues with a check, step 296, of the DSPE count, initialized to zero in the interrupt that occurs prior to the first execution of a DSPE FINE CONTROL mode routine, to ensure that at least two values of the burst peak heights have been obtained to generate a correction signal and, if so, calculates the data servo position error, step 298, in accordance with the equation $$DSPE=(A-B)/(A+B) \quad (2)$$

where A and B are the corrected A and B burst peak heights. Since the detected A and B burst peak heights are substantially a measure of the radial overlap of the selected data head with the A and B burst patterns on the selected data surface, the DSPE will be zero when the selected data head is aligned with the thermal calibration track on the selected data surface and will vary proportionately to the radial distance between the selected data head and the thermal calibration track between the maximum values −1 and +1 when the selected data head is displaced toward the edge or center, respectively, of the disc whereon the selected data surface is formed. For displacements between the data head and thermal calibration track center greater that the width of the head, the DSPE is either 1 or −1 so long as the data head overlaps either an A or B burst pattern.

It is to obtain a value for the DSPE for large initial offsets of the data head from the thermal calibration track, at the time of transition from execution of the SPE FINE CONTROL mode routine to execution of the DSPE FINE CONTROL mode routine, that the A and B burst patterns are provided with the extended radial dimensions shown in FIG. 2. Thus, positioning of the actuator 44 using the DSPE FINE CONTROL mode routine can be effected for misalignments between the selected data head and the servo head that exceed several track spacings. Once the DSPE has been calculated, it is used to calculate the servo correction signal, using the SPE control equation, to be outputted to the servo logic IC, step 300, and the DSPE FINE CONTROL mode routine exits to the SPE FINE CONTROL mode routine at the connection point B shown in FIGS. 7 and 14. As shown in FIG. 7, such exit will result in the output of the servo correction signal, step 188, and the calling of a command routine, in the present case the ACCUMULATE INITIALIZE command routine, to be executed in each interrupt in which the DSPE FINE CONTROL mode routine is executed.

Prior to the third execution of the DSPE FINE CONTROL mode routine, the execution will exit from the decision block 296 to the SPE FINE CONTROL mode routine at the connecting point A which, as shown in FIG. 7, will result in calculation of the servo correction in the usual manner for the SPE FINE CONTROL mode routine; that is, from the servo position error inputted from the servo demodulator 90 at the beginning of each interrupt and the subsequent output of the correction signal to the servo logic IC 78.

The effect of positioning the actuator 44 via a series of executions the DSPE FINE CONTROL mode routine on the location of the servo head 74 with respect to servo tracks on the dedicated servo surface has been illustrated in FIG. 18 in which several servo tracks have been represented by straight lines 302, 304 and 306. More particularly, the line 302 represents the servo track in the same cylinder as the thermal calibration tracks and the lines 304 and 306 represent servo tracks displaced to one side of the servo track in the calibration track cylinder.

Since, as contemplated by the present invention, misalignments between the servo head 74 and data heads may exceed the spacing between tracks on the data and servo surfaces and because of orientation dependent offsets between servo and data tracks, the servo head 74 will trace a sinuous path on the dedicated servo surface that, ideally, can be represented for one complete revolution of the discs by the sinusoidal curve indicated at 308 in FIG. 18. As will be clear to those of skill in the art, the curve 308 is a mapping of such path on the dedicated servo surface obtained by mapping servo tracks into the straight lines 302, 304 and 306. Accordingly, the curve 308 will hereinafter be referred to as the path 308 followed by the servo head 74 on the dedicated servo surface. (Since the correction signals used to guide the actuator 44 during repeated executions of the DSPE FINE CONTROL mode routine are derived from displacements of the data head from the thermal calibration track, the data head will generally undergo random variations in location about the thermal calibration track and the path 308 traced on the dedicated servo surface will similarly exhibit random variations from the sinuous path shown in FIG. 18. For clarity of illustration and discussion of the manner in which the track offsets and thermal calibration relation coefficients are determined, these random variations have not been illustrated. Rather, they are compensated in a manner that will be discussed below.)

As shown in FIG. 18, the path 308 will generally be displaced to one side of the servo track in the cylinder that contains the thermal calibration tracks; that is, the servo track that is represented by the line 302, so that the servo head 74 will undergo sinusoidal oscillations about a centerline 310 between the servo tracks that have been mapped into the lines 304 and 306 in FIG. 18. As will be discussed below, the track offset used to select an optimum servo track to which a seek is made to access a selected data track is determined by the condition that the centerline 310 be within a selected distance from the optimum track that would be selected for following the thermal calibration track on the selected data surface using the SPE FINE CONTROL mode routine that is used during normal data track following operations. More particularly, such distance is selected to be 55% of the spacing between adjacent servo or data tracks. Since track offsets arise from misalignments between the data and servo heads, such criterion will provide an appropriate track offset for all data tracks on the selected data surface for which calibration is being effected.

Figure 15:
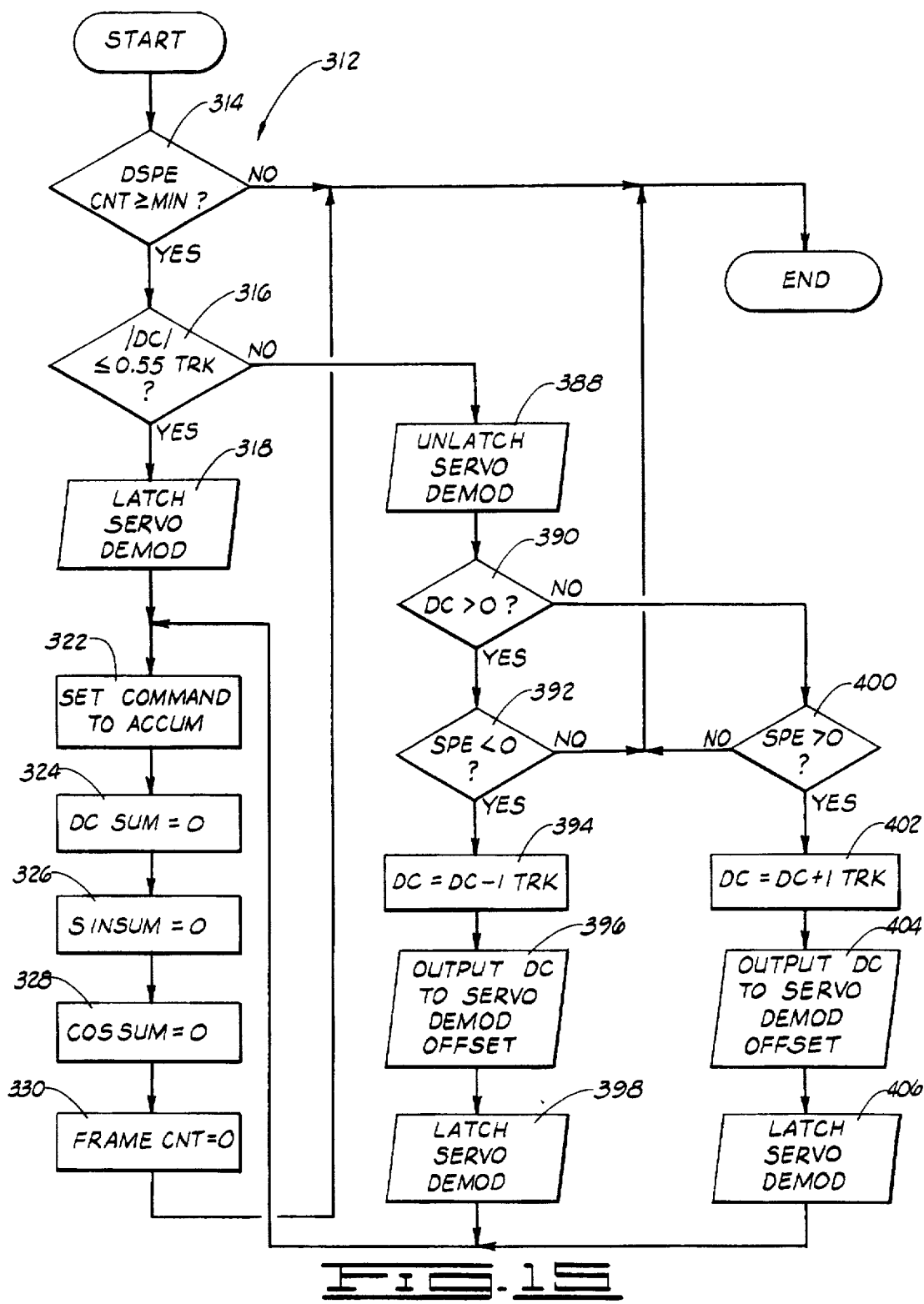
FIG. 15 is a flow chart of the Servo Microprocessor ACCUMULATE INITIALIZE Command Routine.

Referring now to FIG. 15, shown therein is a flow chart 312 of the ACCUMULATE INITIALIZE command routine that is executed following the initial execution of the DSPE FINE CONTROL mode routine and for a number of executions of the DSPE FINE CONTROL mode routine thereafter. Such routine begins with a check, step 314, of the DSPE count to determine whether such count exceeds a minimum value selected to ensure that the DSPE FINE CONTROL mode routine has been executed a sufficient number of times that the selected data head will have achieved stable track following of the thermal calibration track on the selected data surface proximate the selected data head. Until stable track following has occurred, no further instructions are carried out by the servo microprocessor 84 in the execution of an ACCUMULATE INITIALIZE command routine as indicated by the exit to the end of the routine for DSPE counts less than the selected minimum value.

Once stable thermal calibration track following by the selected data head has been achieved, a check is made, step 316 of the size of the coefficient DC of the thermal calibration relation currently stored in the servo microprocessor 84 for a purpose that will become clear below. Specifically, the servo microprocessor determines whether the magnitude of the coefficient DC is within the 55% of a track spacing that, as noted above, provides a criterion for selecting an optimum track for following the thermal calibration track on the data surface being calibrated via repetitive execution of the SPE FINE CONTROL mode routine by the servo microprocessor 84. Since, as noted above, the system microprocessor 60 transmits a value of zero for the coefficient DC when the seek command 234 (FIG. 11) is issued to cause the servo head to seek to the servo track in the same cylinder as the thermal calibration tracks, such value will be zero. Consequently, the servo microprocessor will latch the servo demodulator 90, step 318, so that the servo position error measured by the servo demodulator 90 will be measured with respect to the servo track nearest the servo head 74 at the time of latching and the track address determined by the track address circuit 87 and the phases $\phi 1$ and $\phi 2$ will similarly be the address of the servo track that is nearest to the servo head 74 at the time of latching of the servo demodulator 90.

Returning to FIG. 18, also shown therein is a servo track midline 320 equally spaced between the tracks 304 and 306. In general, the path 308 traced on the dedicated servo surface by the servo head 74 will have portions that extend to either side of the midline 320 so that the servo track nearest the servo head 74 at the time of latching may be either of the tracks that have been mapped into the lines 304 and 306. Thus, either of these servo tracks may form the basis for the determination of the servo position error by the servo demodulator 90 and the address of either track may be identified by the track address circuit 87 and the phases $\phi 1$ and $\phi 2$.

Referring once again to FIG. 15, following latching of the servo demodulator 90, step 318, the command routine selection word is set to ACCUMUMLATE, step 322, and DCSUM, SINSUM and COSSUM registers in the servo microprocessor 84 memory are initialized to zero, steps 324, 426 and 328 respectively, for the accumulation of values in the DCSUM, SINSUM and COSSUM registers that, after scaling, will provide a least squares fit to the thermal calibration relation expressed in equation (1) above. AS is known in the art, the least squares fit can be obtained by accumulating the distance between the servo head and a selected servo track, the product of such distance and the sine of the angle of rotation of the discs from the index orientation and the product of such distance and the cosine of the angle of rotation of the discs from the index orientation for a series of equally spaced angular increments of disc rotation that add to one full rotation of the discs. Since the servo frames are equally spaced about the circumferences of the servo tracks, such accumulation can be effected by accumulating the indicated sums for a number of servo frames equal to the number of servo frames per disc revolution. To provide for the accumulation, the execution of the ACCUMULATE INITIALIZE command routine ends with the initialization of a frame count to zero, step 330.

Figures 16, 17:
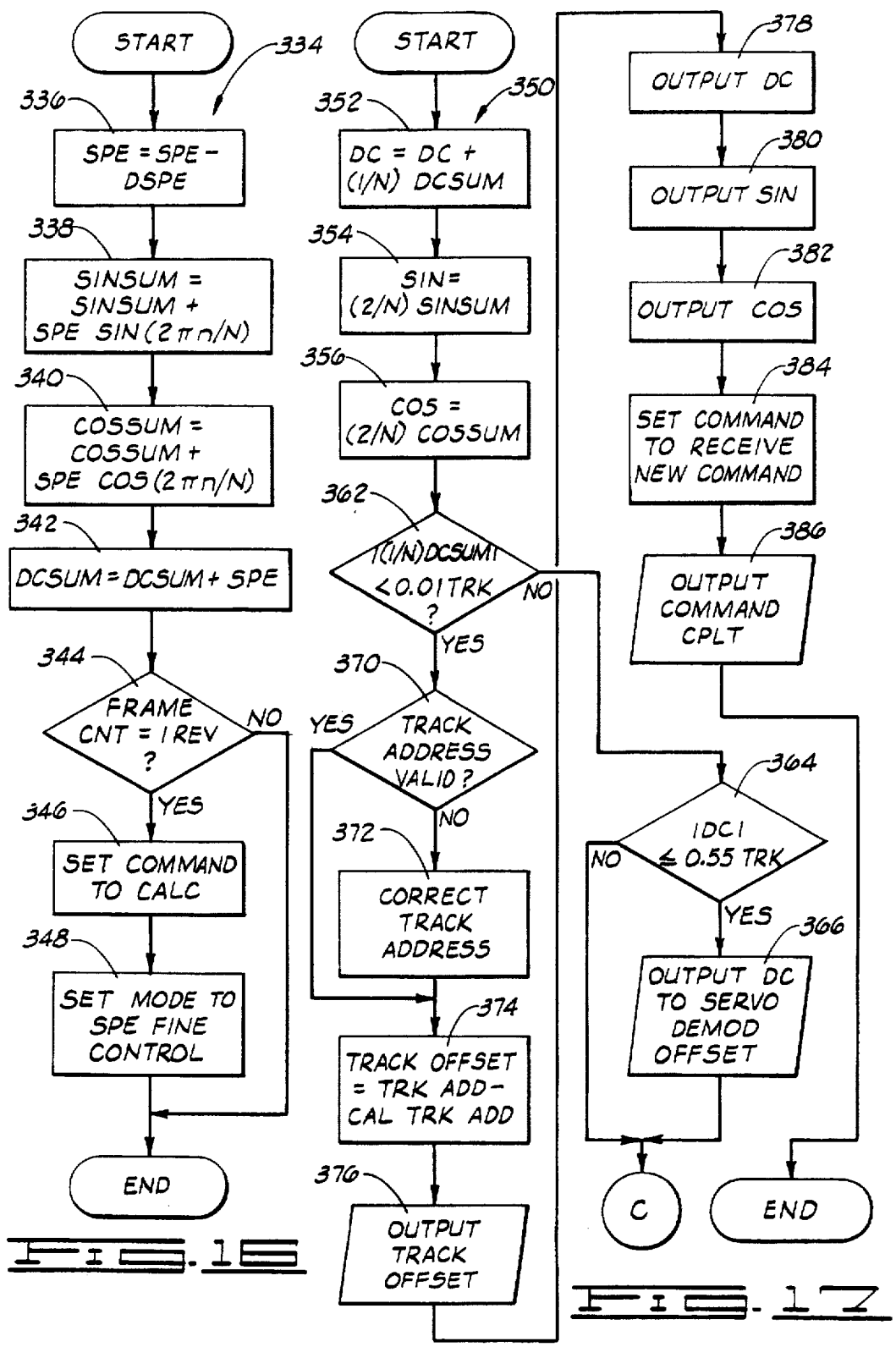
FIG. 16 is a flow chart of the Servo Microprocessor ACCUMULATE Command Routine.
FIG. 17 is a flow chart of the Servo Microprocessor CALCULATE COEFFICIENTS Command Routine.

In each of an ensuing number of interrupts of the servo microprocessor 84 amounting to a complete revolution of the discs, the servo microprocessor 84 will first execute the DSPE FINE CONTROL mode routine to maintain guidance of the selected data head on the thermal calibration track on the selected data surface proximate the selected data head and then execute the ACCUMULATE command routine presented in the flow chart 334 shown in FIG. 16 in which the servo position error generated by the servo demodulator 90 is used to determine the distance between the servo head and the servo track nearest the servo head at the time the servo demodulator 90 was latched at step 318 of the ACCUMULATE INITIALIZE command routine 312 shown in FIG. 15.

As noted above, a novel aspect of the present invention is compensation for random variations in the location of the selected data head with respect to the thermal calibration track during consecutive executions of the DSPE FINE CONTROL mode routine by means of which the actuator 44 is guided during calibration of the selected data head and surface and the consequent random variations of the servo head 74 about the path 308 shown in FIG. 18. While such variations are negligible for disc drives having track spacings that are contemplated for prior art data track following methods, such neglect is contrary to the object of the present invention to maximize track density solely on the basis of orientation dependent misalignments between data and servo tracks. More particularly, the effect of the random variations in the guidance of the actuator 44 would be to convert the path 308 of FIG. 18 to a family of paths that would require a limitation on the allowable departure of the servo head 74 from the selected optimum track as the discs rotate during track following operations in which computer files are accessed. Thus, in the present invention, compensation for the random variations in data and servo head locations during thermal calibration track following by the selected data head is made by adjusting, step 336, the servo position error generated by the servo demodulator 90 by subtracting the data servo position error signal determined from the A and B burst patterns as described above with respect to FIG. 14.

Following such adjustment in each execution of the ACCUMULATE command routine, the contents of the SINSUM register is incremented, step 338, by the product of the servo position error (SPE) read at the beginning of the interrupt in which the ACCUMULATE command routine is executed and the sine of the angle of orientation of the discs from the index orientation, the contents of the COSSUM register is incremented, step 340, by the product of the servo position error (SPE) and the cosine of the angle of orientation of the discs from the index orientation, and the DCSUM register is incremented, 342, by the servo position error signal. In view of the output of a zero offset to the servo demodulator 90 at step 252 of the CALIBRATION command routine 250 shown in FIG. 12, the servo position error signal appearing in these increments will be the displacement of the servo head 74 from the track nearest the servo head at the time the servo demodulator 90 was latched (step 318 of FIG. 15) so that the sums that are accumulated are proportional to coefficients of a least squares fit of the path 308 shown in FIG. 18 with respect to the track nearest the servo head at the time of servo demodulator latching. Thus, if latching occurred at a time that the servo head 74 was located in a portion of the path 308 above the midline 320 between the tracks represented by the lines 304 and 306, the servo position error inputted at the beginning of each of the interrupts in which the ACCUMULATE command routine is executed while the selected data head is guiding on the thermal calibration track will be a negative number which, after adjustment at step 336 above, will be indicative of the present displacement of the servo head 74 from the track represented by the line 304. (As is conventional, the servo position error signal is signed for determination of the displacement of the servo head 74 in either direction from a servo track.) If latching occurred at a time that the servo head 74 was located in a portion of the path 308 below the midline 320 between the tracks represented by the lines 304 and 306, the adjusted servo position error will be a positive number indicative of the present displacement of the servo head 74 from the track represented by the line 306. (In measurements that will be discussed below in which the servo microprocessor 84 repetitively executes the DSPE FINE CONTROL mode routine followed by execution of the ACCUMULATE command routine, the adjusted SPE is caused to be the displacement of the servo head 74 from the centerline 310 of the path 308 in FIG. 18 by outputting a servo offset indicative of the displacement of the servo head from one of the tracks represented by the lines 304 and 306 to the servo demodulator 90 for a purpose that will also be discussed below.)

Following the incrementing of the DCSUM, SINSUM and COSSUM registers, the servo microprocessor checks the frame count to determine whether accumulations for a complete revolution of the discs has occurred, step 342, and, if not, the command routine ends for a subsequent execution at the next interrupt of the servo microprocessor 84. Once the ACCUMULATE command routine has been executed a number of times equal to the number of servo frames in a servo track, the servo microprocessor 84 sets the command routine control word to CALCULATE and the mode routine control word to SPE FINE CONTROL, steps 344 and 346 respectively for an calculation of the thermal calibration relation coefficients.

Prior to discussing the CALCULATE command routine, a flow chart of which is presented at 350 in FIG. 17, it will be useful to summarize the operation of the servo system following the return to execution of the SPE FINE CONTROL mode at each interrupt of the servo microprocessor 84. At the time this return occurs, the servo demodulator 90 will be latched and the servo offset in the servo demodulator 90 will be zero. Accordingly, in each of the ensuing interrupts of the servo microprocessor 84, the raw servo position error signal indicative of the location of the servo head from one of the tracks represented by the lines 304 and 306 will be inputted by the servo microprocessor 84 and, further, the servo microprocessor 84 will input the track address and phases from the track address circuit 87 and servo demodulator 90 that, together, specify the address of the track from which the servo position error signal is measured. Since the mode routine executed in each interrupt of the servo microprocessor is the SPE FINE CONTROL mode, the correction signal that is outputted to the servo logic IC 78 will be determined from the servo position error signal and, since the servo offset is zero, the correction signal that will be calculated is a correction signal that will accelerate the servo head toward the servo track that serves as the basis for the measurement of the servo position error signal; that is the track represented by the line 304 or 306 in FIG. 18 that was nearest the servo head at the time the servo demodulator 90 was latched at step 318 of the ACCUMULATE INITIALIZE command routine 312 (FIG. 15) that was executed prior to the accumulation of the sums in the SINSUM, COSSUM and DCSUM registers. Accordingly, the servo head will, after several interrupts of the servo microprocessor 84 with no further change in the mode and command routine selection words, follow the servo track that was nearest the servo head at the time the servo demodulator 90 was latched and, at each interrupt that occurs, the address of such servo track will be provided by the track address circuit 87 and the phases φ1 and φ2 generated by the servo demodulator 90.

Referring to FIG. 16, in the first interrupt of the servo microprocessor 84 following the change of the command routine to the CALCULATE COEFFICIENTS command routine, the coefficients of the thermal calibration relation that will yield a least squares fit of the curve 308 in FIG. 18 are calculated, steps 352, 354 and 356, in a manner that with one exception is conventional. That is, the contents of the SINSUM and COSSUM registers are multiplied by the factor (2/N), where N is the number of servo frames per servo track, and the contents of the DCSUM register is multiplied by the factor (1/N). The results of the multiplications, for the SINSUM and COSSUM registers are stored as the coefficients of the thermal calibration relation. The exceptional case is the calculation of the DC coefficient to be stored. As shown at step 352, the DC coefficient is the sum of the previously stored value of the coefficient and the scaled contents of the DCSUM register. Since the previously stored value for DC is zero, the resulting DC coefficient will be the DC coefficient for a least squares fit of the curve 308 shown in FIG. 18 with respect to the servo track, represented by the line 304 or the line 306, nearest the servo head at the time the servo demodulator 90 was latched at step 318 of FIG. 15. More particularly, the calculated value for DC will be the distance indicated at 358 or the negative of the distance indicated at 360 in FIG. 18 for movement of the servo head 74 as indicated by the path 308 during the accumulation of DCSUM, SINSUM and COSSUM while the selected data head was guided, by multiple executions of the DSPE FINE CONTROL mode routine, on the thermal calibration track on the selected data surface.

The determination of the DC coefficient of the thermal calibration relation by updating a previous value of such coefficient is utilized to verify the thermal calibration relation coefficients prior to their transmittal to the system microprocessor 60 for use during data track following. To this end, following the determination of the coefficients DC, SIN and COS, the magnitude of scaled contents of the DCSUM register, |(1/N) DCSUM| is compared to the spacing between adjacent tracks on the discs, step 362, and, if the value of |(1/N) DCSUM| is not less than one percent of such spacing, the measurements of the coefficients are repeated. (In the rare circumstance that the centerline 310 of the path 308 traced on the dedicated servo surface by the servo head 74 is substantially coincident with a servo track, to yield a value for |(1/N) DCSUM| that is less than one percent of a track spacing, the verification is not performed. Rather, the track offset and thermal calibration relation coefficients determined in the measurements described above are transmitted to the system microprocessor 60 as will be discussed below.)

In the first step of the verification procedure, the magnitude of value determined for the coefficient DC of the thermal calibration relation is compared to the criterion for selection of the optimum servo track for guiding the servo head to cause the selected data head to follow a selected data track on the selected data surface; that is, that the centerline of a path traced on the dedicated servo surface by the servo head 74 during data track following, without offset, by the selected data head be less that 55% of a track spacing from the optimum servo track. Since such centerline is defined by the coefficient DC in the thermal calibration relation, the magnitude of DC determined at step 352 is compared, step 364, to the spacing of the tracks on the data and servo surfaces and, if such magnitude is less than 55% of a track spacing, it is outputted, step 366, to the servo demodulator 90 as the servo offset and the CALCULATE COEFFICIENTS command routine exits to the CALIBRATION command routine at the connection point C shown in FIGS. 12 and 17. If the magnitude of DC is greater than 55% of a track spacing, the CALCULATE COEFFICIENTS command routine exits to the CALIBRATION command routine without outputting the value of coefficient DC to the servo demodulator.

Returning to FIG. 12, it will be seen that, with one or two exceptions, depending upon the magnitude of the coefficient DC, the exit to the CALIBRATION command routine in the interrupt in which the CALCULATE COEFFICIENTS command routine was called will place the servo microprocessor 84 in the same state that resulted from the issuance of the calibrate command by the system microprocessor 60 at step 238 of the system microprocessor servo calibration routine. The two possibilities with respect to these exceptions will now be considered in turn beginning with the case in which both exceptions occur.

For the case in which the magnitude of the coefficient DC is less than 55% of a track spacing, the exceptions are that the servo demodulator 90 is latched at the beginning of the measurements of the thermal calibration relation coefficients and the servo offset that is subtracted from the raw SPE by the servo demodulator 90 to obtain the SPE that is inputted by the servo microprocessor at the beginning of each interrupt will be the value determined for DC in the previous set of measurements. Specifically, and as shown in FIG. 12, the return to the CALIBRATION command routine is to a point in the routine that occurs after the output of a zero offset to the servo demodulator 90 and latching of the servo demodulator in the previous execution of CALIBRATION command routine.

For the case in which the magnitude of DC is less than 55% of a track spacing to occur, the servo track that was nearest the servo head 74 at the time the servo demodulator 90 was placed in the latched mode of operation at step 318 of the ACCUMULATE INITIALIZE command routine 312 shown in FIG. 15 must have been a servo track for which the centerline 310 of the path 208 traced on the dedicated servo surface by the servo head 74 during subsequent guiding of the actuator 44 by repetitive execution of the DSPE FINE CONTROL mode routine was within 55% of a track spacing. That is, the servo track nearest the servo head at the time of latching of the servo demodulator 90 was an optimum servo track for data head following of the thermal calibration track on the selected disc surface via guiding of the actuator 44 utilizing repetitive executions of SPE FINE CONTROL mode routine. Thus, the repetition of the thermal calibration relation coefficient measurements will be carried out with the servo demodulator 90 generating servo position error signals with respect to an optimum servo track; that is, a servo track that is optimum for following the thermal calibration track on the selected data surface by servo track following by the servo head 74, and with a servo offset that, for servo track following by the servo head 74, would displace the servo head from the optimum servo track to cause the selected data head to follow a path that can vary only sinusoidally about the thermal calibration track on the selected data surface. Thus, when the actuator 44 is subsequently positioned by repetitive execution of the DSPE FINE CONTROL mode routine, the servo head will again follow the path 308 in FIG. 18 but the servo position error signals inputted from the servo demodulator 90 at the beginning of each interrupt by the servo microprocessor 84 will vary in accordance with the curve illustrated in dashed line at 368 in FIG. 18. (AS can be seen from the location of the centerline 310 in FIG. 18, such figure has been drawn for the case in which the track represented by the line 304 is the optimum servo track for positioning the actuator 44 utilizing repetitive executions of the SPE FINE CONTROL mode routines to cause the selected data head to follow the thermal calibration track on the selected data surface.)

As a result, when the ACCUMULATE command routines are repetitively executed, as described above, the DCSUM register will accumulate a value of zero while the SINSUM and COSSUM will again accumulate sums which, with scaling by the factor (2/N), will indicate the disc orientation dependent offset which, if added to the previously determined value of the coefficient DC and outputted to the servo demodulator 90 during actuator positioning using the SPE FINE CONTROL mode routine, would cause the servo head to follow the path indicated at 308 in FIG. 18. But, since the path 308 is the path followed by the servo head at such times that the selected data head is following the thermal calibration track without offset, the values of the coefficients so determined will be the coefficients of the thermal calibration relation necessary to effect data track following by positioning the servo head in relation to a servo track. That is, the quantities DC, SIN and COS determined at steps 352, 354 and 356, when the servo microprocessor again executes the CALCULATE COEFFICIENTS command routine 350 (FIG. 17), will be the desired coefficients for the thermal calibration relation for the selected data head and surface.

Moreover, since the DCSUM register will have accumulated a value of zero, the comparison of the value of |(1/N) DCSUM| with one percent of a track spacing at step 362 will yield a positive result to cause the calibration procedure for the selected data head and data surface to be concluded in steps of the CALCULATE COEFFICIENTS command routine that will now be described with continuing reference to FIG. 17.

As has been noted above, the phases $\phi1$ and $\phi2$ generated by the servo demodulator 90 provide information that permits the address of the track nearest the servo head 74 at the time an interrupt of the servo microprocessor 84 occurs to be converted to the address of the servo track that was nearest the servo head 74 at a previous time at which the servo demodulator was latched. Thus, regardless of the position of the servo head 74 in relation to the servo tracks on the dedicated servo surface at the time the CALCULATE COEFFICIENTS command routine is executed, the address of the optimum servo track; that is, the servo track represented by the line 304 in FIG. 18 for the case under consideration, can be determined in the same manner that track addresses are corrected during seeks as described in the aforementioned U.S. patent application Ser. No. 738, 053. Such determination is carried out in the decision block 370, in which the phases $\phi1$ and $\phi2$ are utilized to determine whether the track address read following interruption of the servo microprocessor 84 is the address of the optimum servo track, and, if not, in the further step 372 in which the address read by the servo microprocessor 84 is corrected.

Once the address of the optimum servo track for following the thermal calibration track on the selected data surface by following the optimum servo track on the dedicated servo surface has been obtained, the track offset for the selected data head and data surface is determined by merely subtracting such optimum track address from the known track address for the cylinder that contains the thermal calibration tracks, step 374. The track offset, and the coefficients of the thermal calibration relation are then outputted to the system microprocessor 60, steps 376, 378, 380 and 382 and the command routine control word is changed to NEW COMMAND, step 384. As a result, following the change in the command routine control word, the servo microprocessor 84 will first execute the SPE FINE CONTROL mode routine and then the NEW COMMAND command routine in each interrupt in the same manner that the servo microprocessor 84 executes such routines during normal track following operations. That is, the servo microprocessor will take up normal servo track following on the optimum servo track for causing the selected data head to follow the thermal calibration track on the selected data surface in the same manner that other data tracks are followed by optimum servo track following in the manner that has been described above with respect to FIGS. 6 through 10. The servo microprocessor 84 then outputs a command complete signal to the system microprocessor 60, step 386, that will cause the system microprocessor 60 to input the track offset and thermal calibration relation coefficients, steps 242 and 244 of FIG. 11, as described above, and, if the selected data head is not the last of the data heads to be calibrated, initiates calibration for the next data head and data surface.

As has been noted above, a second possibility exists when the value of |(1/N) DCSUM| is compared to one percent of a track spacing in the initial execution of the calibration procedure following the issuance of the calibrate command by the system microprocessor 60. Specifically, the value of |(1/N) DCSUM| may exceed 55% of a track spacing. Such case will occur if the servo track nearest the servo head 74 at the time the servo demodulator 90 is latched (step 316 of the ACCUMULATE INITIALIZE command routine 312 shown in FIG. 15) is not the optimum servo track for causing the selected data head to follow the thermal calibration track on the selected data surface by guiding the servo head 74 in relation to the servo pattern on the dedicated servo surface. Thus, for the case in which the path that will be traced on the dedicated servo surface by the servo head 74 during positioning of the actuator 44 by repetitive execution of the DSPE FINE CONTROL command routine is located as shown at 308 in FIG. 18 between tracks represented by the lines 304 and 306, latching of the servo demodulator 90 at such times that the servo head is nearer the track represented by the line 306 will cause the value of |(1/N) DCSUM| to have a value indicated by the distance 358 in FIG. 18 that is greater than 55% of a track spacing. In this case, as shown in FIG. 17, the execution of the CALCULATE COEFFICIENTS command routine will exit from decision block 364 to the CALIBRATION command routine 250 shown in FIG. 12 without outputting the measured value of the coefficient DC to the servo demodulator. Hence, the servo offset applied by the servo demodulator will remain zero. Thus, the only exception between the state of the disc drive 20 after the return to the CALIBRATION command routine and the state of the disc drive 20 at the time the execution of the CALIBRATION command routine reaches the step 256 following the reception by the servo microprocessor 84 of a calibrate command from the system microprocessor 60 is that the servo demodulator 90 will be latched. Thus, the servo microprocessor 84 will follow the steps that have been discussed above to undertake thermal calibration track following on the selected data surface by the selected data head via repetitive execution of the DSPE FINE CONTROL mode routine so that the servo head will again trace the path indicated at 308 in FIG. 18 on the dedicated servo surface.

Similarly, once thermal calibration track following by execution of the DSPE FINE CONTROL mode routine has been effected and stabilized, the servo microprocessor will again execute the ACCUMULATE INITIALIZE command routine shown in FIG. 15. However, since the coefficient DC has now been determined in a previous set of measurements to be greater than 55% of a track spacing, the execution of the routine will branch at the decision block 316 to a step 388 in which the servo microprocessor 84 unlatches the servo demodulator 90. Accordingly, the servo position error signal generated by the servo demodulator 90 as position fields of servo frames on the dedicated servo surface pass the servo head 74 will be determined in relation to the servo track nearest the servo head 74 at the time the passage occurs and, moreover, since the servo offset applied by the servo demodulator 90 has remained zero, the servo position error signal that will be inputted by the servo microprocessor 84 in ensuing interrupts will be a positive or negative number indicative of the side of the nearest servo track to which the servo head 74 is located.

Following unlatching of the servo demodulator 90, the servo microprocessor 84 determines the sign of the previously determined value of the coefficient DC, step 390, and, if the path that is being traced on the dedicated servo surface is that represented by the curve 308 in FIG. 18, will determine that the coefficient DC is positive. That is, the centerline 310 will be to the positive side of the servo track 306 that was nearest the servo head 74 at the time the servo demodulator 90 was latched in the previous set of measurements.

Thus, the execution of the ACCUMULATE INITIALIZE command routine will proceed to a step 392 for a determination of the sign of the servo position error signal inputted at the beginning of the interrupt in which the ACCUMULATE INITIALIZE command routine is executed by the servo microprocessor 84. Since, at the time such interrupt occurred, the servo demodulator 90 was latched and had been latched from a time in which the servo head 74 was nearer the track represented by the line 306 in FIG. 18 than the track represented by the line 304, the servo position error signal will, for the first execution of the ACCUMULATE INITIALIZE command routine, be a positive number. Specifically, the servo position error signal will correspond to the height of the curve 308 above the line 306 at the last passage of a servo position field by the servo head 74. As shown in FIG. 15, the servo microprocessor 84 is programmed to respond to a positive value for the servo position error at step 396 to return to its main program with no change in the state of the disc drive 20 for execution of the DSPE FINE CONTROL mode routine and the ACCUMULATE INITIALIZE command routine in the next interrupt of the servo microprocessor 84.

However, the execution of the ACCUMULATE INITIALIZE command routine will have resulted in the unlatching of the servo demodulator so that subsequent of the servo position error will be measured with respect to the servo track nearest the servo head 74. Accordingly, since portions of the path 308 are nearest the optimum servo track represented by the line 304 in FIG. 18, an execution of the ACCUMULATE INITIALIZE command routine must occur for which the servo position error signal inputted by the servo microprocessor 84 is negative. When such execution occurs, the previously determined value of the coefficient DC is decremented by an amount equal to one track spacing, step 394, and outputted to the servo demodulator 90, step 396. The servo demodulator 90 is then latched, step 398, and the routine proceeds to step 322 in which the command control word is set to ACCUMULATE.

The effect of these steps is to establish precisely the same state for the disc drive 20 that occurred in the previously described case in which the magnitude of the coefficient DC was determined to be less than 55% of a track spacing at step 364 of the CALCULATE COEFFICIENTS command routine 335 shown in FIG. 17. Specifically, since the steps are carried out only when the servo track nearest the servo head 74 is the optimum servo track for the thermal calibration track on the selected data surface, latching of the servo demodulator 90 for accumulation of the sums that yield the thermal calibration relation coefficients will have occurred at a time that the servo head is nearer the optimum servo track represented by the line 304 than to the track represented by the line 306 in FIG. 18. Similarly, for such track, the value of the coefficient DC will have been a negative number because of the location of the path 308 centerline 310 to the negative side of the optimum servo track so that the subtraction of one track space from the positive value of DC greater than 55% of a track space will yield a negative value that, moreover, will be indicative of the distance between the centerline 310 and the optimum track represented by the line 304 in FIG. 18. Finally, the output of the adjusted value for the coefficient DC will have the same effect on subsequent measurement of the servo position error that output of the coefficient has, for the previously described case, at step 366 of the CALCULATE COEFFICIENTS command routine 350 shown in FIG. 17. Thus, the operation of the disc drive 20 will proceed as described above to the determination and output to the system microprocessor 60 of the track offset that will yield the optimum servo track for any selected data track on the selected data surface and the servo offset from such optimum data track that will cause the selected data head to follow the selected data track under repetitive execution of the SPE FINE CONTROL mode routine.

As noted above, FIG. 18 has been drawn for the case in which the servo track represented by the line 304; that is, a servo track that is to the positive side of the path traced on the dedicated servo surface by the servo head 74 during DSPE FINE CONTROL track following, is the optimum servo track that would be determined for the thermal calibration tracks on the data surfaces. Such may not be the case; instead, the optimum servo track may be to the negative side of the path traced by the servo head. In such case, the optimum servo track is caused to be selected and the servo position error signal with respect to such track and with a servo offset equal to the value of the previously measured DC coefficient is caused to be measured in the second execution of the calibration procedure by the execution of steps which have been indicated at 400, 402, 404 and 406 in FIG. 15. Specifically, in this case, the first measured value for the coefficient DC will be a negative number for previous latching on the non-optimum track, now the track represented by the line 304, so that the decision block 390 will cause the routine to branch to the decision block 400 which causes completion of the execution of the routine and a transition to the ACCUMULATE command routine only if the servo position error is positive indicating that the servo head 74 is located in a portion of the path traced on the dedicated servo surface that is the optimum track for the thermal calibration tracks on the selected data surface. (If latching of the servo demodulator 90 occurred in the previous measurements at a time the servo head was nearer the optimum track than the other of the two tracks between which it is located, the second execution of the calibration procedure will be as discussed above for the case in which the magnitude of the coefficient DC is less than 55% of a track spacing.) This step will be followed by the addition, step 402, of one track spacing to the previously measured, negative value of the previously measured value of the coefficient DC to obtain a positive value that is appropriate for the optimum track and latching, output of this value to the servo demodulator 90, step 404, and latching of the servo demodulator 90, step 406, at a time that the servo track nearest the servo head 74 is the optimum servo track. The thermal calibration procedure is then completed as has been described above to obtain the track offset and the thermal calibration relation coefficients for the selected data head and surface.

Once the track offsets and thermal calibration relation coefficients have been determined for all data heads and surfaces and stored in the system microprocessor 60, the system microprocessor 60 returns to the processing of read/write operations (step 158 of FIG. 4) in which a selected data head is caused to follow a selected data track containing a file to be read or to which a file is to be written is accessed by seeking to the optimum servo track for that data head and that data track and repetitively executing the SPE FINE CONTROL mode routine with a servo offset determined, in each execution, by the thermal calibration relation as has been described above.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. In a disc drive for the storage of computer files wherein the files are stored along data tracks on data surfaces of a plurality of rotating discs by data heads supported proximately the data surfaces by an actuator positionable with respect to the discs to radially position the data heads on the data surfaces; wherein the data tracks are organized into concentric cylinders each including a servo track defined by a servo pattern prerecorded on a dedicated servo surface of one of said discs; and wherein the disc drive comprises servo means, including a servo head supported on the actuator proximate the dedicated servo surface, for positioning the actuator so as to position the servo head in relation to the servo tracks, whereby the servo means can be operated to move the servo head to a selected servo track and subsequently position the servo head in relation to the selected servo track to position the data heads in relation to the data tracks; a method for following a selected data track on a selected data surface by the data head proximate the selected data surface comprising the steps of:

selecting an optimum track on the dedicated servo surface for positioning the selected data head in relation to the data tracks on the selected data surface by positioning the servo head in relation to the optimum track on the dedicated servo surface, wherein the optimum track is displaced from the servo track in the cylinder containing the selected data track by a track offset comprising a predetermined number of track spacings that will compensate for misalignment between the selected data head and the servo head that exceeds a track spacing;

moving the servo head to the optimum track; and subsequently positioning the servo head with respect to the optimum track to displace the servo head from the optimum track in accordance with a predetermined thermal calibration relation that will compensate for misalignments between the data and servo heads and tracks that are less than a track spacing.

2. The method of claim 1 further comprising the step of determining the track offset and thermal calibration relation for each data surface and data head proximate thereto from time to time.

3. The method of claim 2 wherein a thermal calibration track is written to each data surface in a thermal calibration cylinder for reading by the data head proximate the data surface; wherein the disc drive further comprises thermal calibration means connectable to a selected data head for generating a data servo position error signal indicative of the location of a selected data head with respect to the thermal calibration track on the data surface proximate the selected data head from a reading of the thermal calibration track by the selected data head; wherein the servo means is further characterized as a means selectively operable for positioning the actuator in relation to the data servo position error signals while reading the servo pattern on the dedicated servo surface to determine the location of the servo head in relation to the servo tracks; and wherein the step of determining the track offset and thermal calibration relation for each data surface and data head proximate thereto comprises the steps of:

operating the servo means in response to the data servo position error signals to position the actuator so as to substantially align the data head with the thermal calibration track on the data surface proximate the data head;

repetitively reading the servo pattern on the dedicated servo surface to repetitively sample the location of the servo head with respect to the servo tracks;

determining the optimum servo track for following the thermal calibration track on the data surface from the samples of the servo head location;

selecting the track offset for the data head as the number of track spacings between the optimum servo track for following the thermal calibration track and the servo track in the cylinder containing the thermal calibration tracks; and determining the thermal calibration relation for the data surface from the servo head location samples.

4. The method of claim 3 wherein the step of operating the servo means in response to the data position error signals to position the actuator so as to position the data head with the thermal calibration track on the data surface proximate the data head comprises the steps of:

repetitively reading the thermal calibration track on the disc surface proximate the data head to generate said data servo position error signals, whereby each data servo position error signal provides a sample of the location of the data head with respect to the thermal calibration track on the data surface proximate the data head;

determining an actuator correction signal from each of the data servo position error signals; and repositioning the actuator in relation to each actuator correction signal; and wherein the step of determining the thermal calibration relation comprises the steps of:

determining an adjusted servo head location with respect to the optimum servo track for following the thermal calibration track for each measurement of the servo and data head locations by subtracting the data head location with respect to the thermal calibration track from the concurrently measured servo head location with respect to the optimum track for following the thermal calibration track; and determining the coefficients of the thermal calibration relation from a selected number of adjusted servo head locations.

* * * * *

UNITED STATES PATENT AND TRADEMARK OFFICE
CERTIFICATE OF CORRECTION

PATENT NO. : 5,777,816
DATED      : July 7, 1998
INVENTOR(S) : Hampshire & Woods It is certified that error appears in the above-identified patent and that said Letters Patent is hereby corrected as shown below:

Column 12, line 36, start a new paragraph with --Once the parameters...--

Signed and Sealed this

Eleventh Day of May, 1999

Attest:

Q. TODD DICKINSON

*Attesting Officer*         *Acting Commissioner of Patents and Trademarks*